INVENTORS
ANDREAS LUKSCH
BERTIL J. SUNDBERG

INVENTORS
ANDREAS LUKSCH
BERTIL J. SUNDBERG
ATTORNEYS

INVENTORS
ANDREAS LUKSCH
BY BERTIL J. SUNDBERG

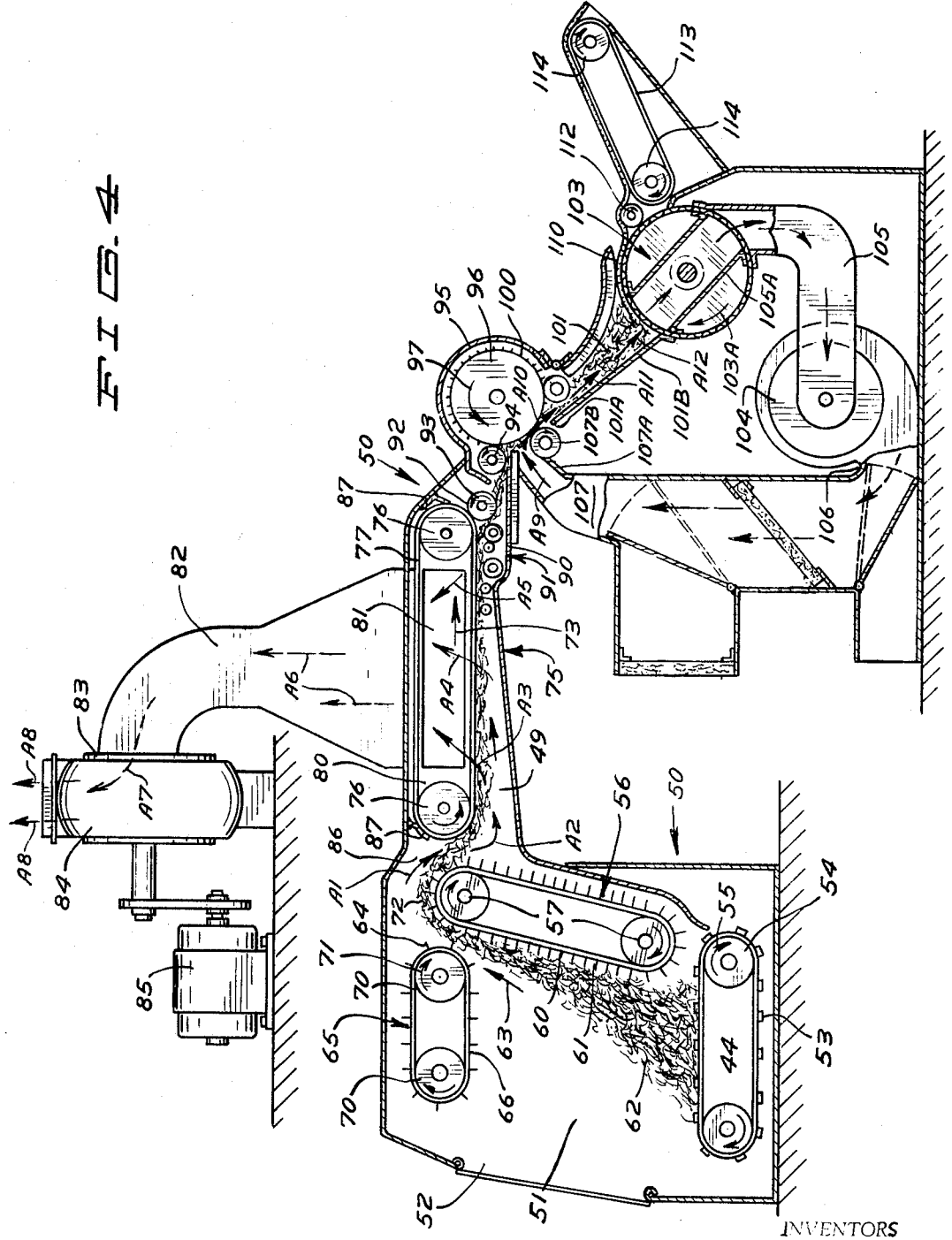

INVENTORS
ANDREAS LUKSCH
BY BERTIL J. SUNDBERG

ATTORNEYS

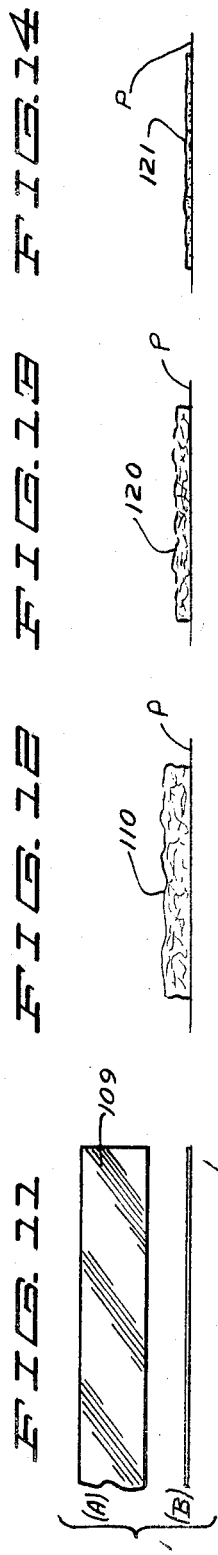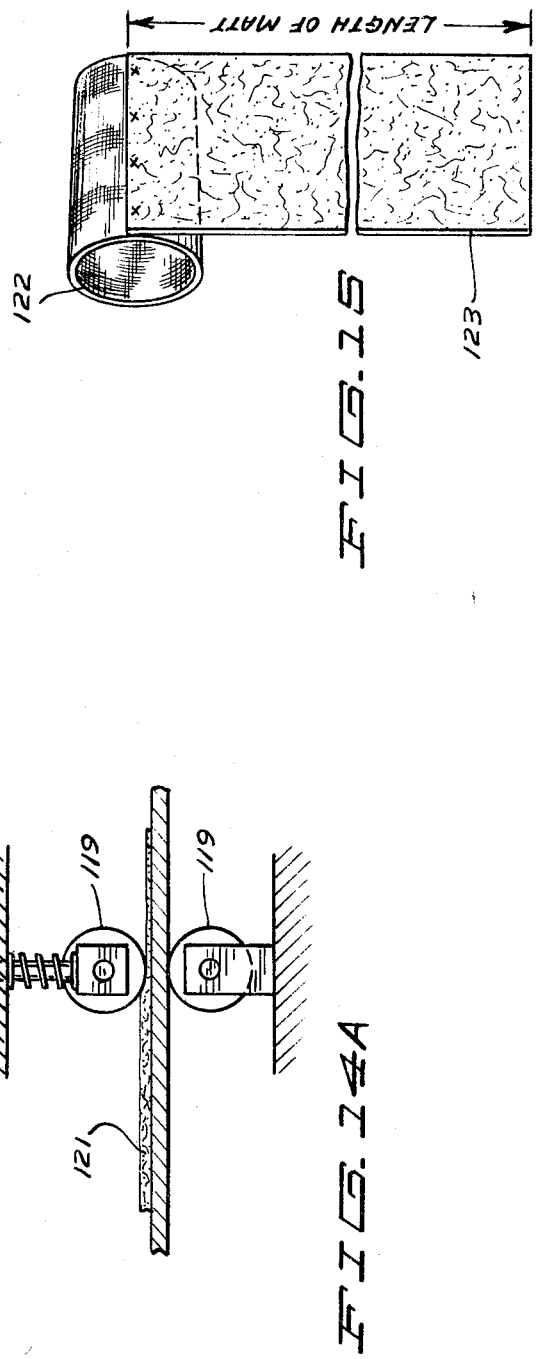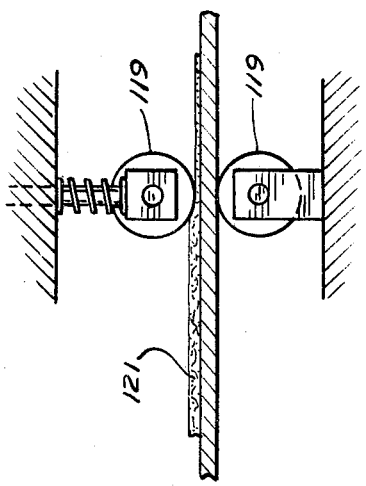

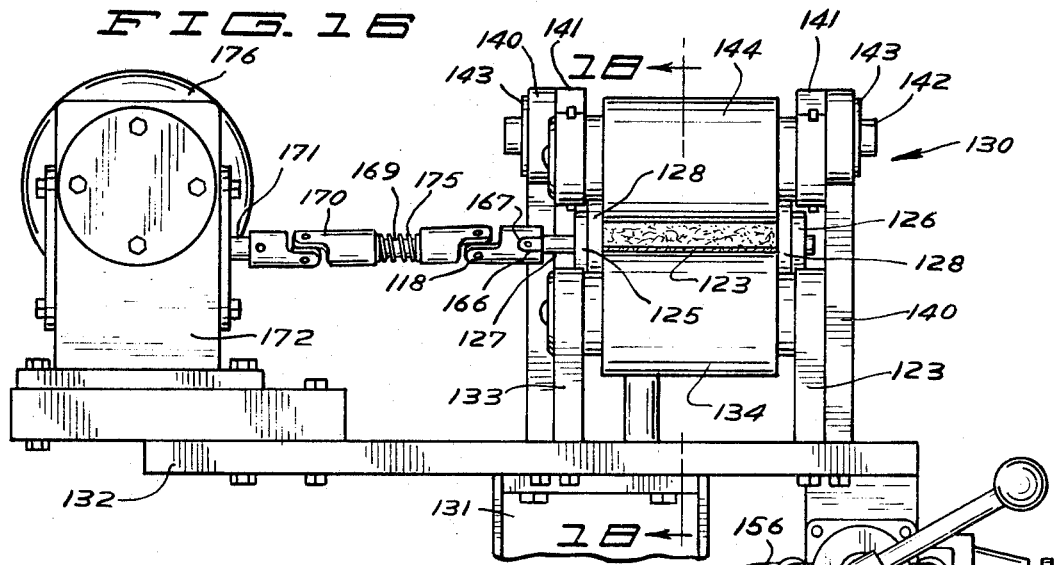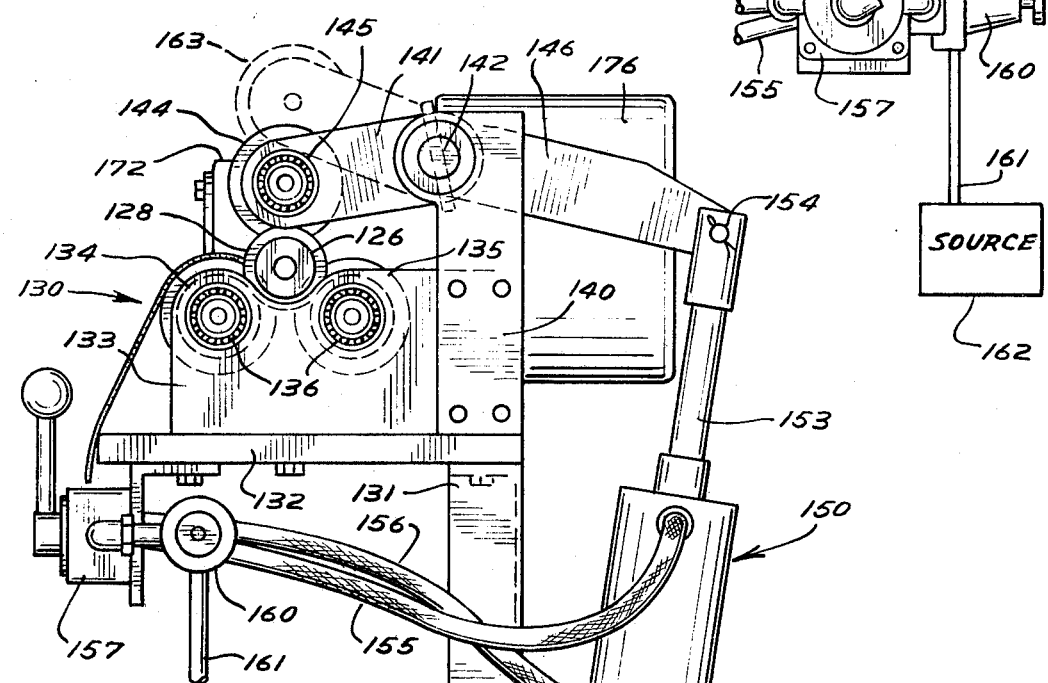

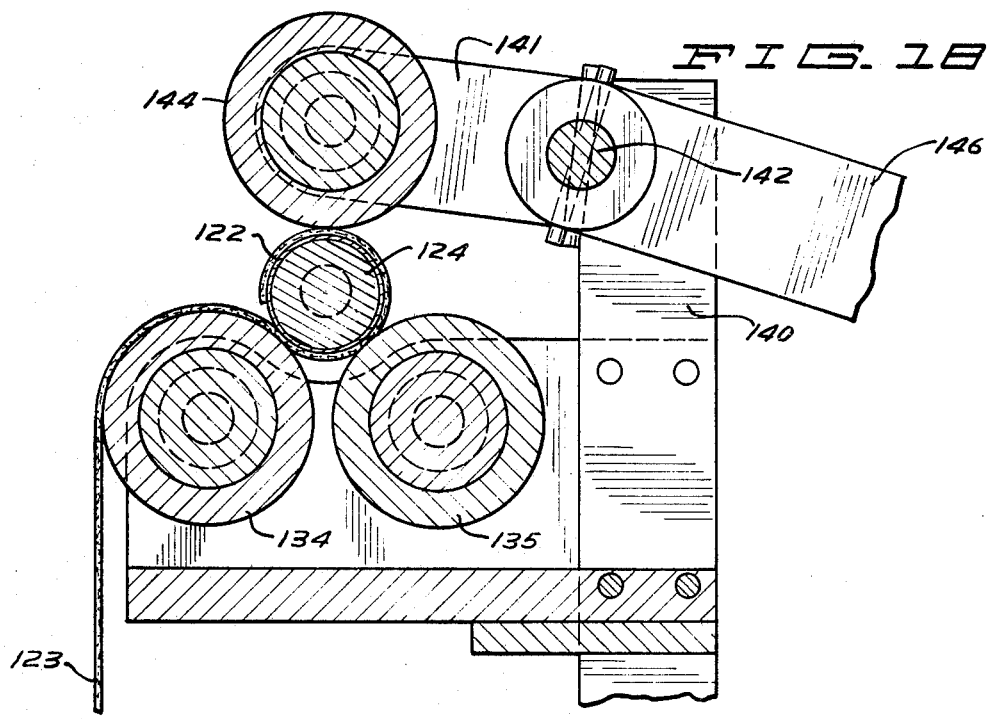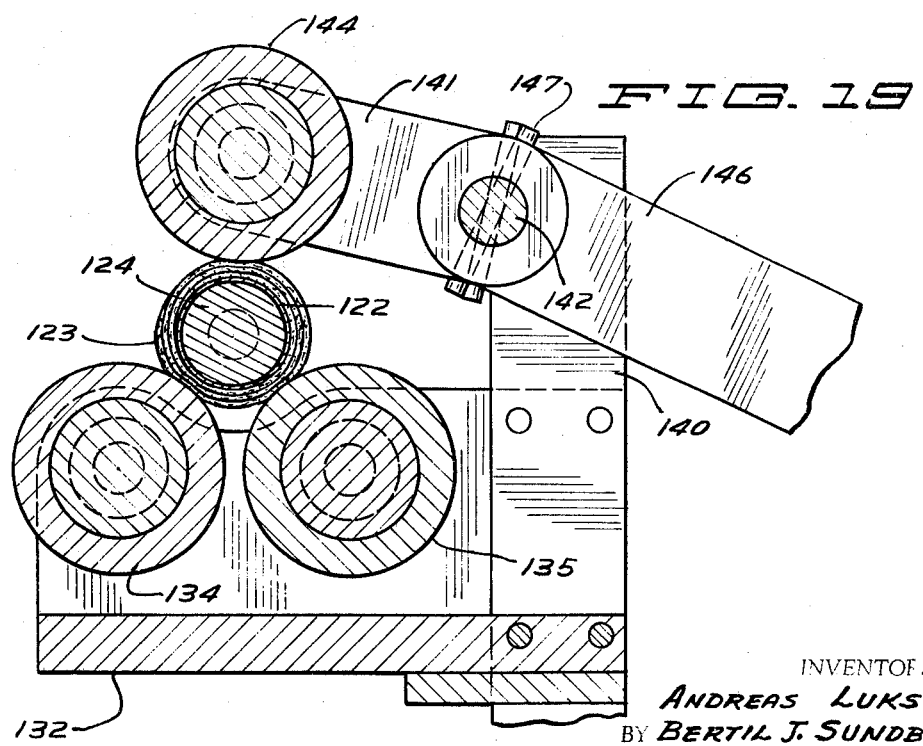

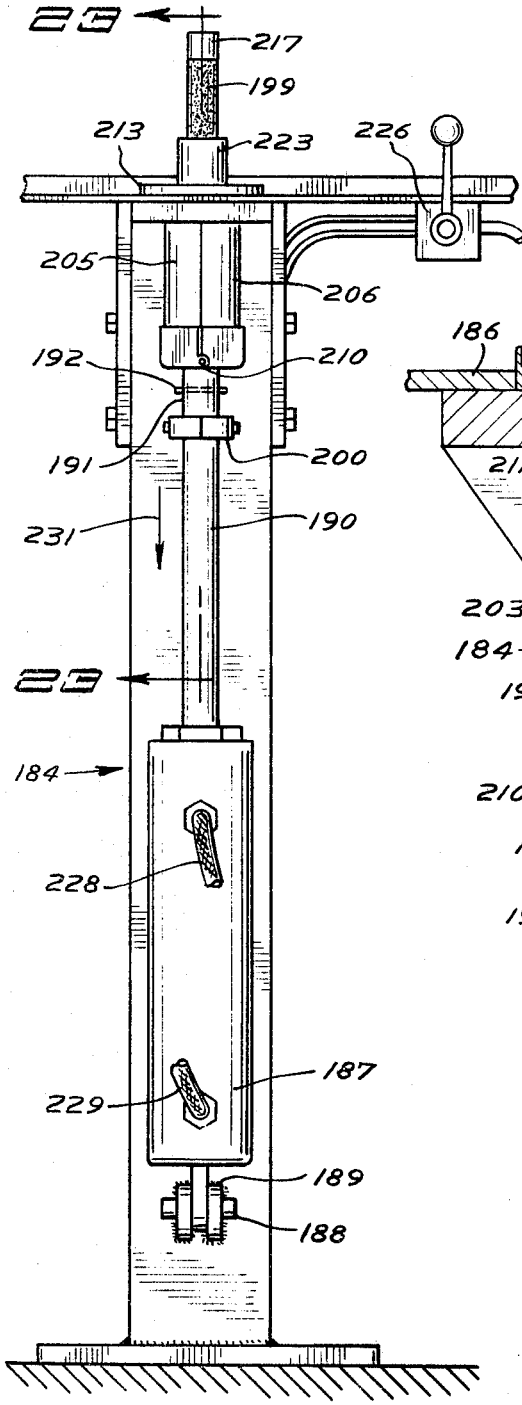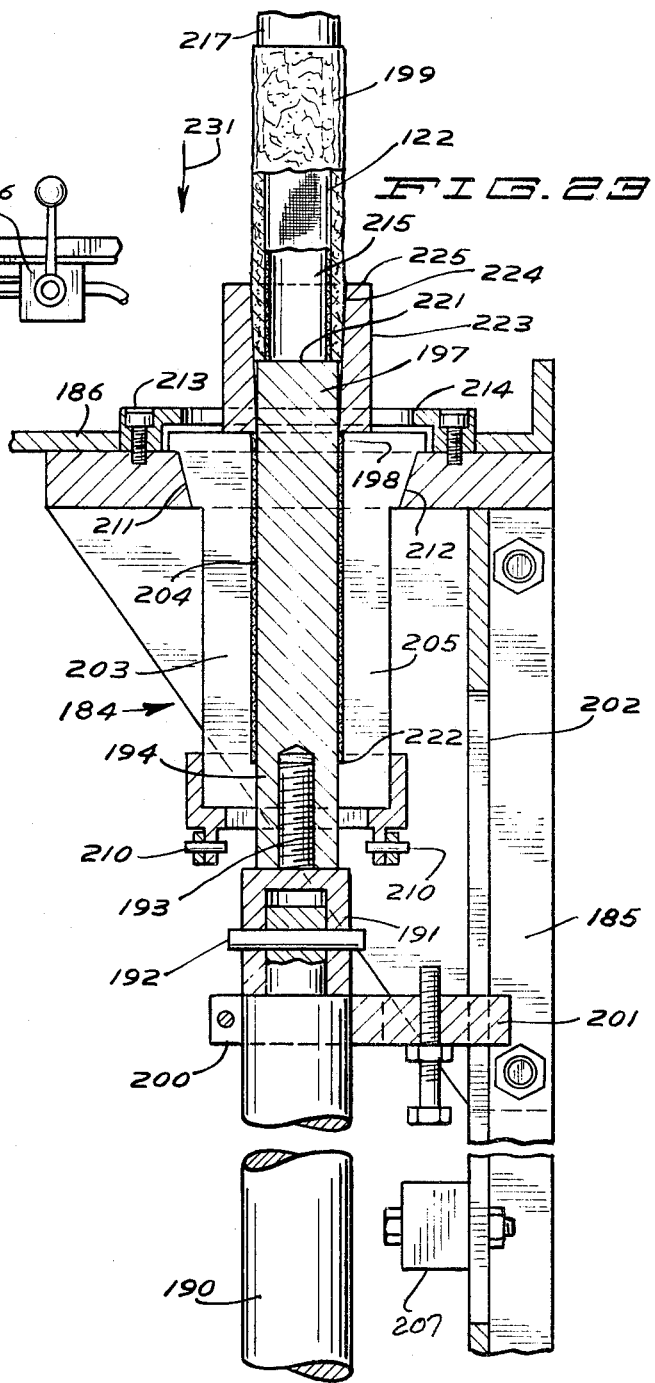

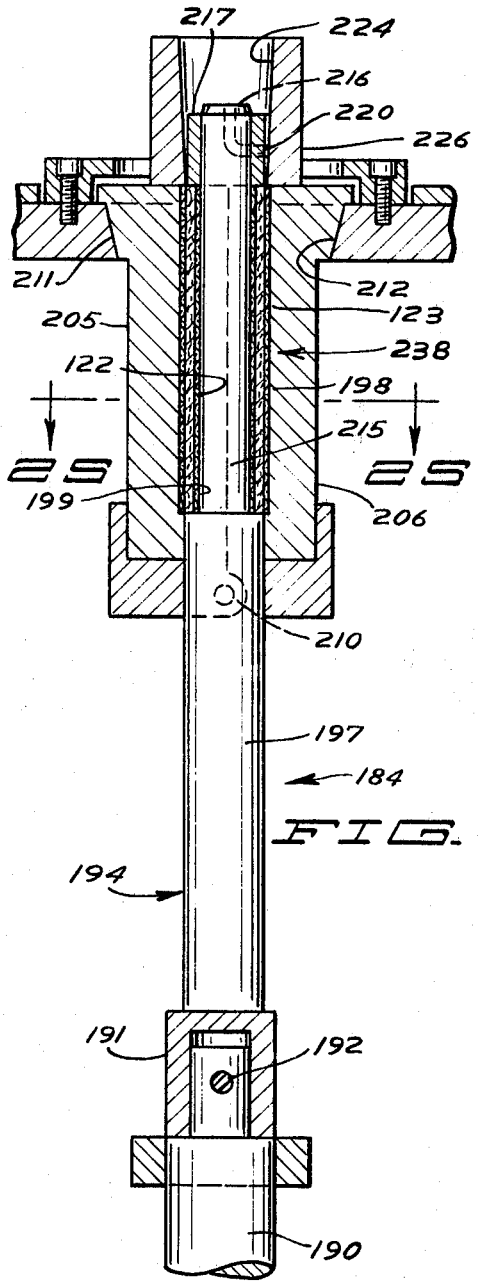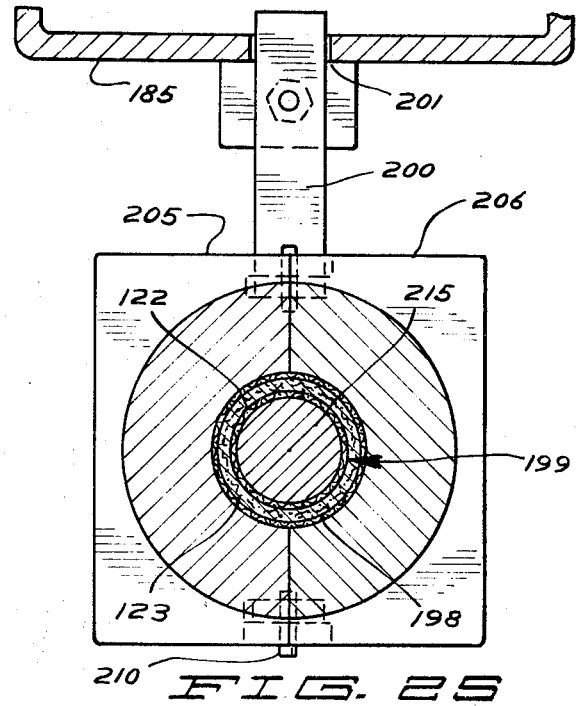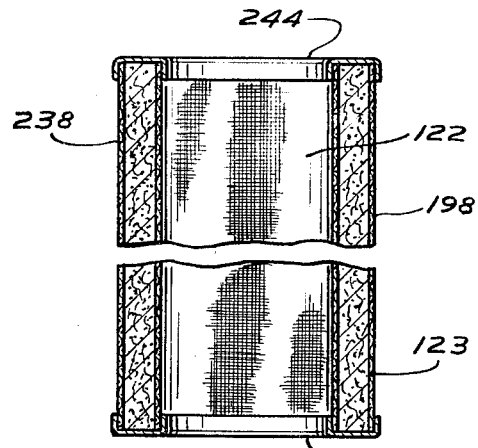

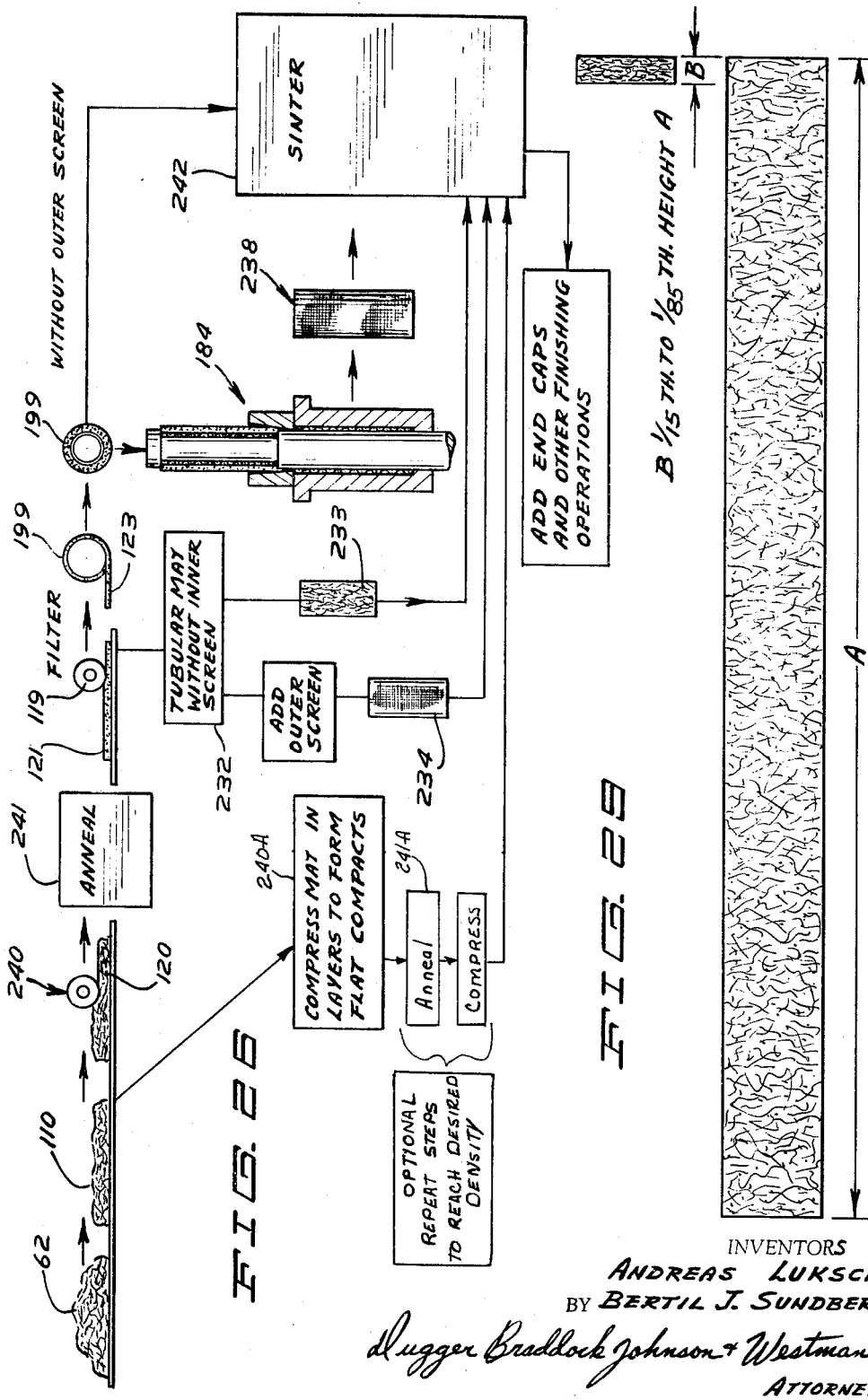

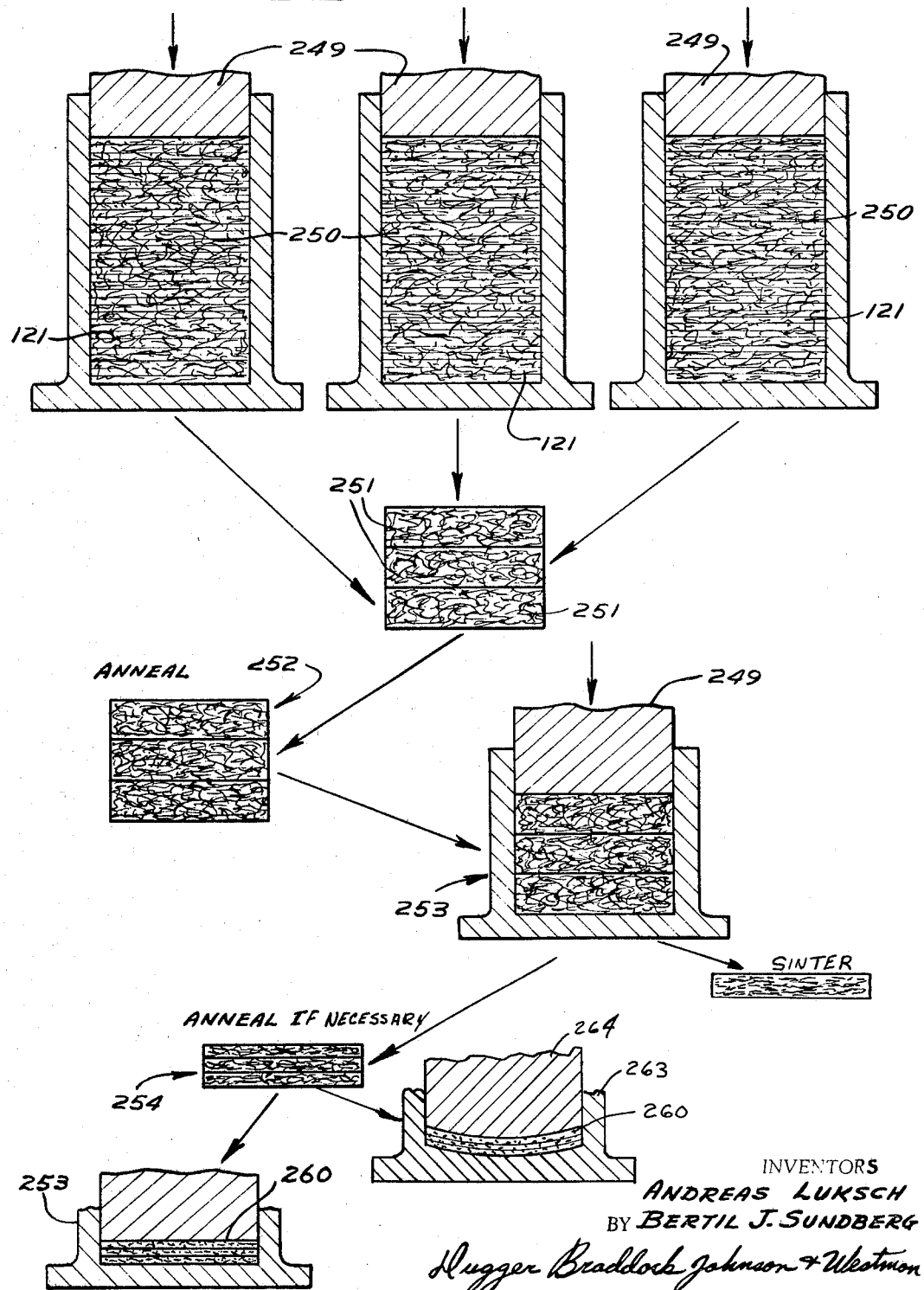

United States Patent Office 3,505,038
Patented Apr. 7, 1970

3,505,038
METAL FIBRIL COMPACTS
Andreas Luksch, Excelsior, and Bertil J. Sundberg, Minneapolis, Minn., assignors, by mesne assignments, to Brunswick Corporation, Chicago, Ill.
Filed Aug. 24, 1964, Ser. No. 391,708
Int. Cl. B23p 17/06; B32b 15/00
U.S. Cl. 29—183.5                    15 Claims

ABSTRACT OF THE DISCLOSURE

Method and product: Compacts composed of fibrils of tough, recalcitrant metals such as stainless steel; the density of the compacts being about 30% to 85% of the density of the metal of which the "fibrils" are composed. The fibrils range in transverse dimension from about .0005 to .005 inch, have an area less than that of a .002 inch circle, are of uniform length, and are made by shearing off narrow width pieces from the end of a rolled strip of parent metal. Individual fibrils have the two flat rolled faces of the parent strip and two sheared faces, the width of one of the sheared faces being wider than the other as a result of shearing, so that the cross section of the fibril ranges from roughly triangular to squashed four-sided configuration with the two rolled faces converging toward the narrower of the sheared faces. Compacts are made by separating the fibrils and air lifting them against a traveling screen through which loose extraneous burrs, chips and slivers are substantially removed, thereby leaving a mat of fibrils substantially free from degraded particles which might otherwise contaminate the mat and migrate through it. The mat has excellent green strength and is compressed through several stages preferably with intermediate annealing until the densities are obtained. Compacts of varying densities throughout the thickness of the compact may be prepared. The compacts composed of the compressed mat (or layers of mat) may be supported on exterior surfaces by woven or reticulated metal support members. Extremely recalcitrant metals such as hard-to-work Type 347 stainless steel alloy and similar difficultly machinable metals may be utilized for making the original fibrils. The finished compacts are useful for sophisticated filtering and the like applications and for transpiration cooled surfaces.

---

The present invention relates to metal fibril compacts and to methods and machines for making such compacts.

The metal fibril compacts of the present invention are formed from novel metal fibrils which, if desired, may be made from metals having the highest available factors of mechanical strength and toughness and temperature and corrosion resistance. The compacts of the present invention may thus have, in turn, factors of mechanical strength and toughness and temperature and corrosion resistance far exceeding any fibrous-metal devices previously available.

It is an object of the invention to provide such fibrous-metal devices.

The invention provides fibril compacts having the qualities of improved mechanical strength, toughness, a wide range of pore sizes, controlled uniformity of pore size, graded pore size (when desired) a wide range of densities, very high temperature and corrosion resistance, improved freedom from degenerate particles and hence from particle migration, freedom from deterioration, and what is very important, lowered costs. It is an object of the invention to provide fibrous metal devices having the aforesaid advantages.

The present invention provides novel methods and machines for fabricating mats from a bulk quantity of novel loose metal fibrils wherein, in such methods, and the starting material, which is already substantially free from slivers, chips, burrs and the like degenerate small particles, is maintained clean as by re-cleaning and is then further processed in such a manner for mat formation that un-attached slivers, chips, and the like degenerate material will not be formed to any great extent during mat formation or if formed, will be substantially removed. The result is that small and unwanted particles are for practical purposes eliminated from the mat and from the final fibrous compact made therefrom, and uses of the complete compacts for sophisticated duties will not be impaired.

One of the features of the invention is the formation of a web or mat of metal fibrils having good "green strength" such that it may be handled without deterioration during processing for maintaining uniform density throughout the mat during processing and in the ultimate finished product.

The green strength of the compact is of much importance in producing commercially useful items inasmuch as the originally formed mat must remain homogeneous at least during the early stages of formation in order that the finished product shall reliably provide a uniform (or controlled) density and pore size. The importance of green strength will be appreciated when it is realized that the webs or mats of the invention, when first made, may have a density in the range of about 1% or 2% and in the finished product may have a density from 15% to 20% up to 75%–80% or even more.

It is an object of the invention to provide methods for making low density metal fibril mats under close conditions of control and handling having the aforesaid characteristics and to provide such mats.

It is another object of the invention to provide improved tubular and flat-formed fibrous metal compacts useful as filters, transpiration devices, fuel burners, structural members, and the like.

Other and further objects are those inherent in the invention herein illustrated, described and claimed and will be apparent as the description proceeds.

To the accomplishment of the foregoing and related ends, this invention then comprises the features hereinafter fully described and particularly pointed out in the claims, the following description setting forth in detail certain illustrative embodiments of the invention, these being indicative, however, of but a few of the various ways in which the principles of the invention may be employed.

The invention is illustrated by the drawings wherein the same numerals refer to the same parts and in which.

Figure 1:
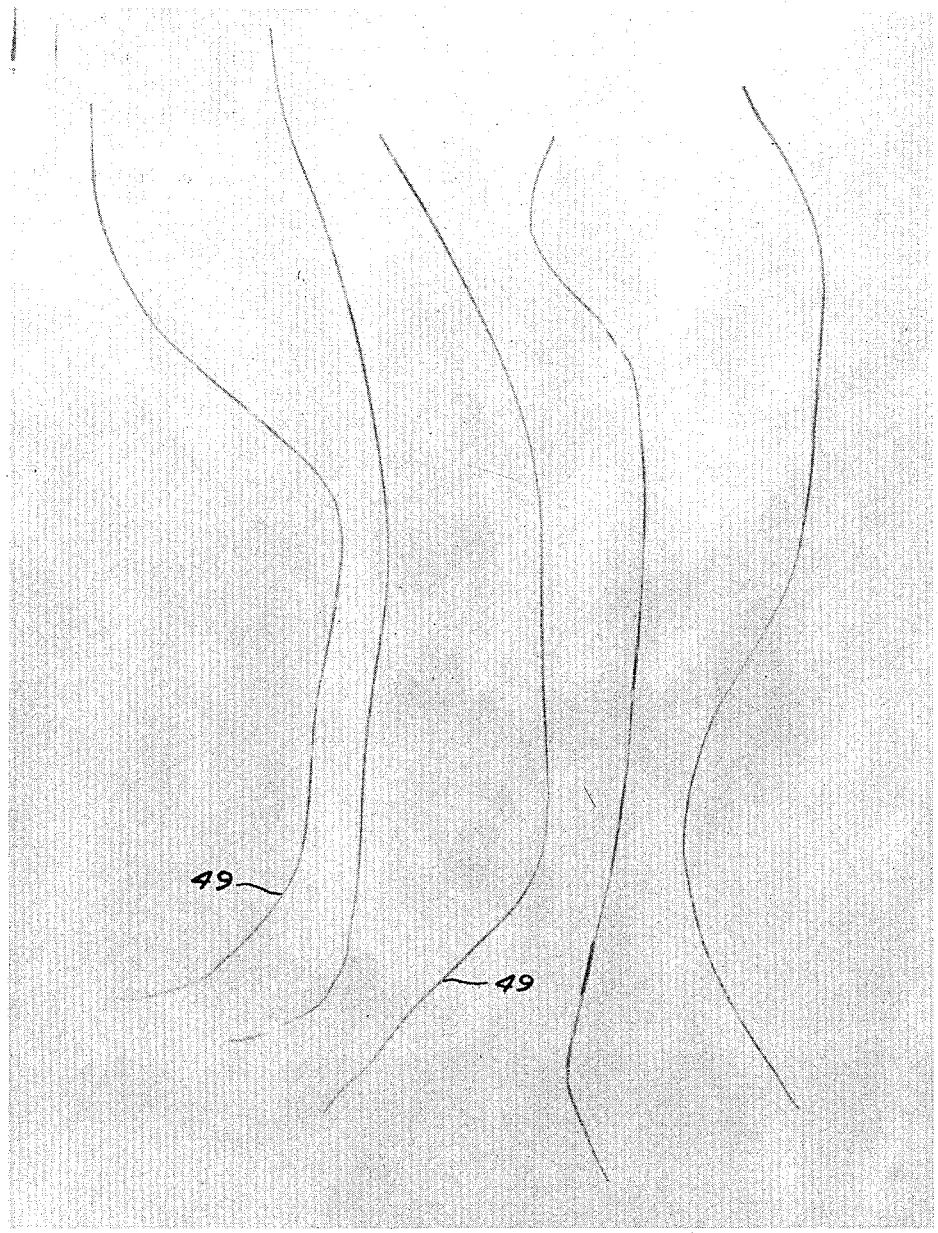
FIG. 1 is a photograph enlarged twelve times showing the metal fibrils used as the starting material for making the compacts of the present invention.
Figure 2:
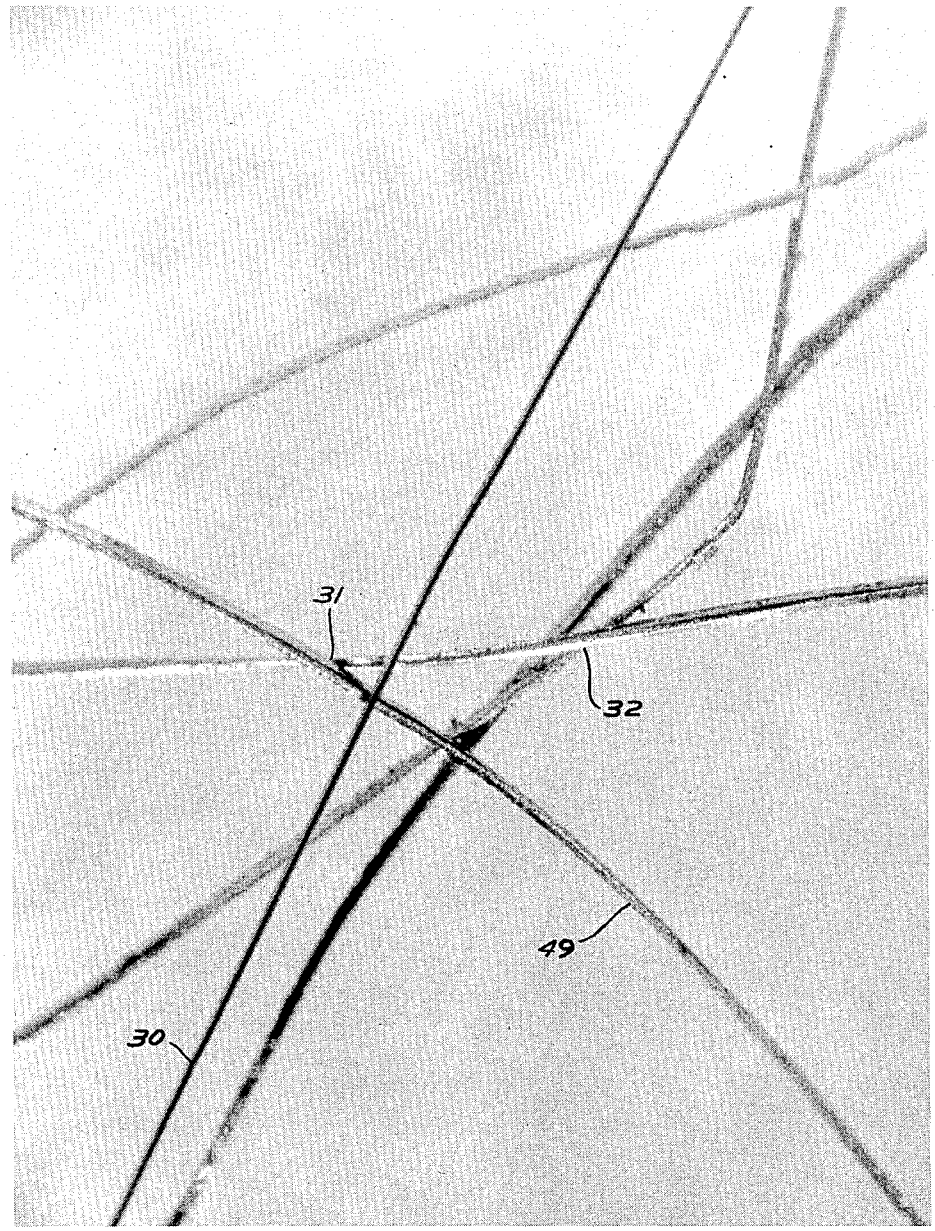
FIG. 2 is a photograph enlarged eighty times showing several of the fibrils used as the starting material for making metal fibril compacts of the present invention and showing the details of the edge configuration of these fibrils. In this photograph a drawn wire of known dimension is shown for purposes of comparison.
Figure 3:
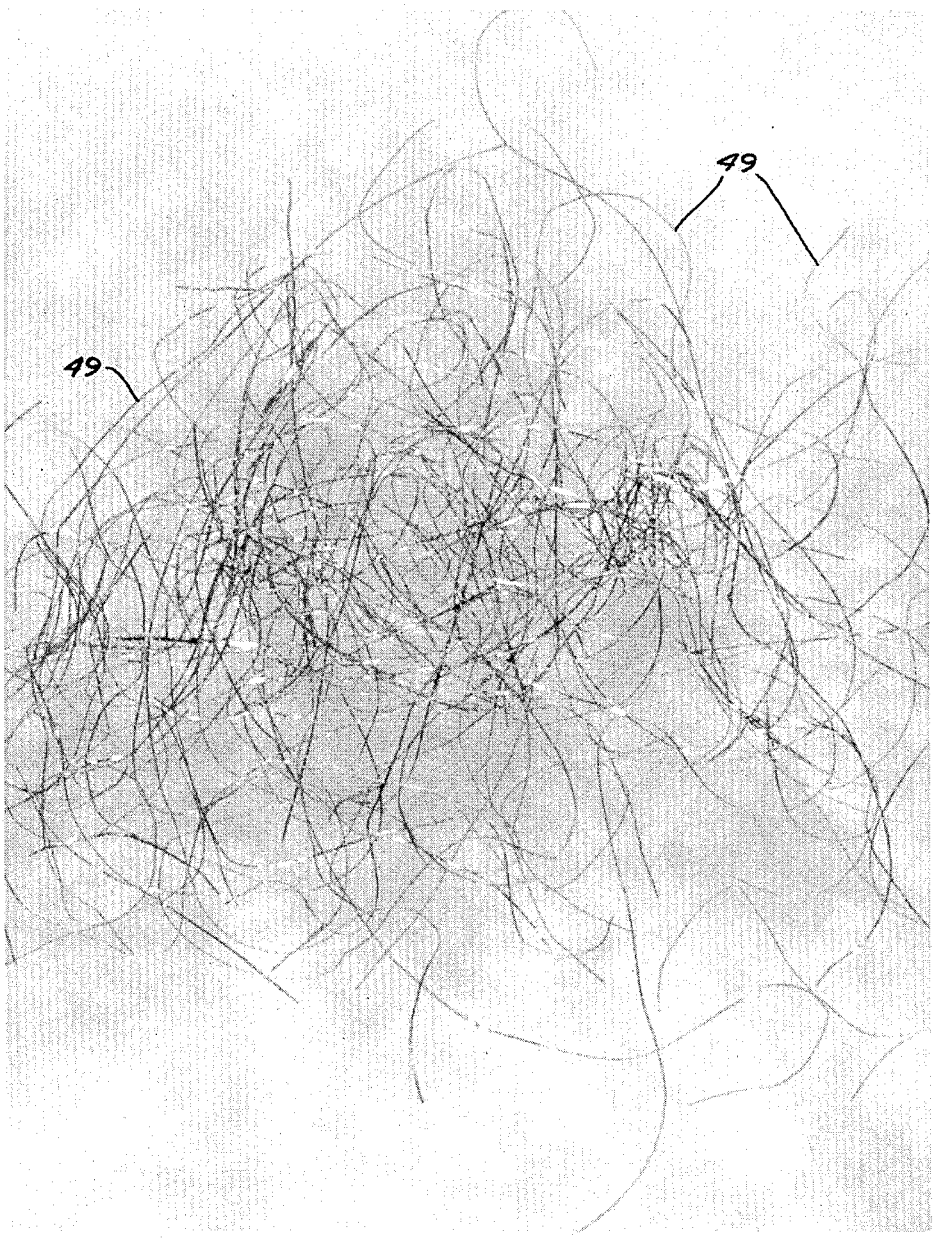
Figure 5:
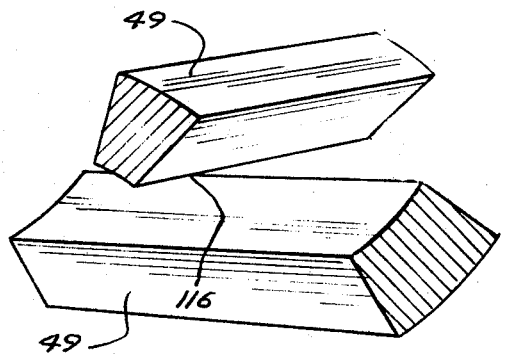
Figure 6:
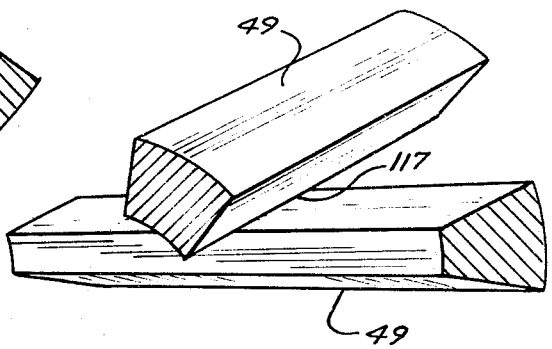
Figure 7:
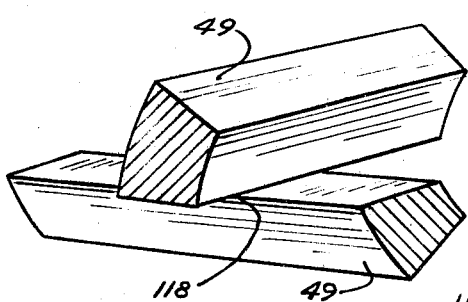
Figure 8:
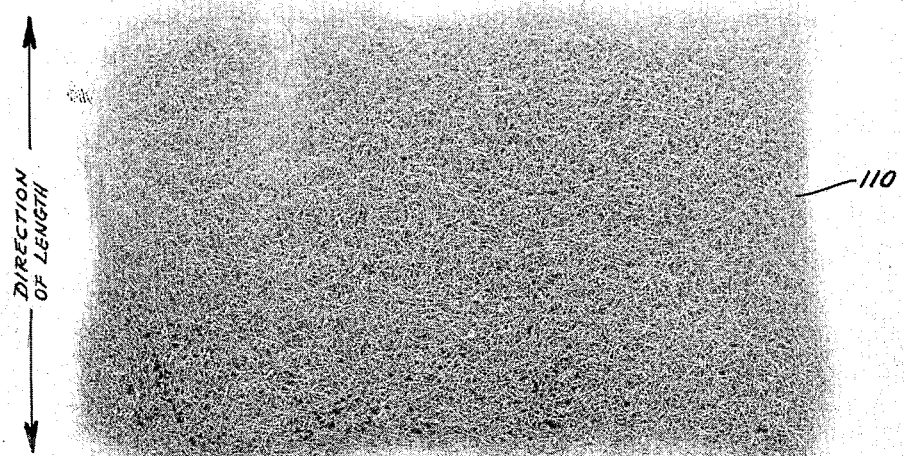
Figure 9:
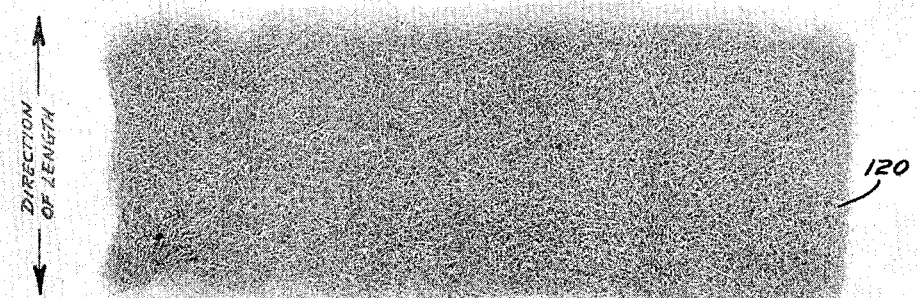
Figure 10:
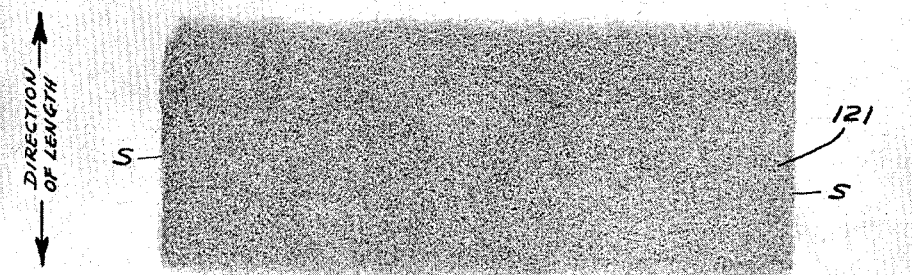

FIG. 3 is a photograph enlarged twelve times showing the fibrils used as the starting material for making the metal fibril compacts of the present invention. In this photograph the fibrils are shown in a loose pile. This photograph illustrates the various twisting and turning of the fibrils, the intertwining thereof, and the many varieties of intersections and type of contact between the fibrils;

FIG. 4 is a part schematic longitudinal sectional view of one form of a machine used for carrying out the process for forming the fibrils illustrated in FIGS. 1, 2 and 3 into a loose mat of substantially uniform density and configuration as a first stage of making a metal fibril compact according to the present invention;

FIGS. 5, 6 and 7 are very much enlarged fragmentary perspective views, partly in section illustrating various types of contacts which develop between the fibrils when they are compacted into mat formation. FIG. 5 shows an edge-to-edge (point) contact; FIG. 6 shows an edge-to-edge (line) contact and FIG. 7 shows a face-to-face (area) contact;

FIG. 8 is an actual size photograph of a short piece of a length of a loosely formed mat composed of fibrils of the kind shown in FIGS. 1–3 after the fibrils have been processed by the machine shown schematically in FIG. 4;

FIG. 9 is an actual size photograph showing a short piece of a length of FIG. 8 after it has been initially compressed by rolling it to improve its green strength, and showing the details of fibril orientation and intersections as this greater density;

FIG. 10 is an actual size photograph of a short piece of a length of the mat of FIG. 9 after it has been annealed in an annealing furnace and trimmed to width;

FIG. 11 shows two views at A and B. View A is a plan view and view B is a side (edge) view of a strip of metal foil from which the fibrils of FIGS. 1–3 have been made. In view B, the thickness of the strip is greatly enlarged;

FIG. 12 is a side elevational view of the mat of FIG. 8;

FIG. 13 is a side elevational view of the mat of FIG. 9;

FIG. 14 is a side elevational view of the mat of FIG. 10;

The three views, FIGS. 12, 13 and 14 show for comparison the thickness of the fibril mat when just formed, (FIGS. 8 and 12) initial compression (FIGS. 9 and 13) and after annealing (FIGS. 10 and 14).

Figure 20:
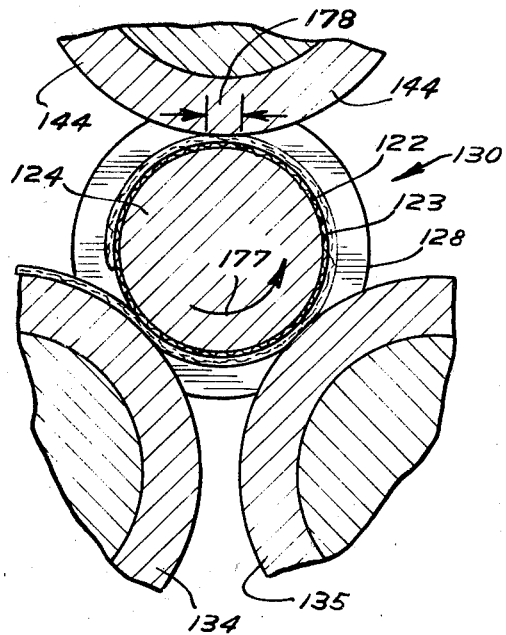
Figure 21:
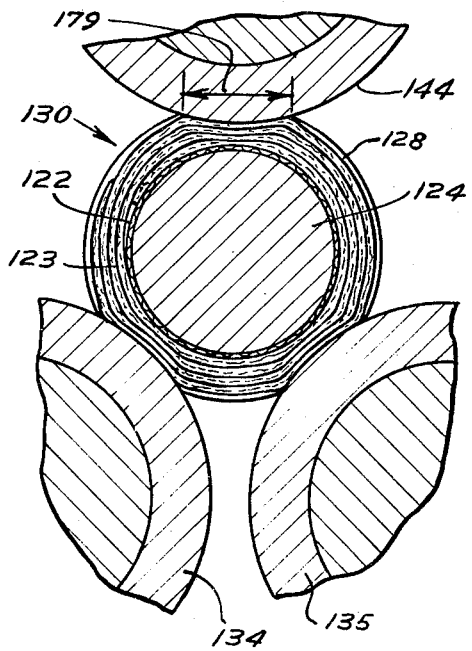

FIG. 14A is a schematic side view illustrating a way for initially compressing the mat shown in FIG. 14 by rolling it to increase its density;

FIG. 15 is a perspective view of the mat of FIG. 14 showing it attached to a preformed inner filter screen and illustrating the first step of formation of the mat of FIG. 14 into a tubular filter for fluids and the like;

FIG. 16 is a front elevational view of a machine of the invention utilized for spirally winding the component of FIG. 15 into a tubular form on the preformed inner filter screen;

FIG. 17 is a side elevational view of the device of FIG. 16;

FIG. 18 is a fragmentary enlarged vertical sectional view taken along the line and in the direction of arrows 18–18 of FIG. 16 illustrating an early stage of the spiral winding process by which the component of FIG. 15 is formed into tubular configuration;

FIG. 19 corresponds to FIG. 18 and shows the final stages of the same spiral winding process;

FIG. 20 is a fragmentary much enlarged portion of the vertical sectional view of FIG. 18 and illustrates the arcs of contact between the pressure rollers and the mat (of FIGS. 14 and 15) during an early stage of the spiral winding of the component of FIG. 15 as it is wound into a tubular configuration;

FIG. 21 corresponds to FIG. 20 and shows the increased areas of contact between the mat and the pressure rollers during the final stages of winding of the mat (of FIGS. 14 and 15) into a tubular configuration;

FIG. 22 is a front elevational view of a machine which may optionally be utilized in a subsequent step a method of the invention for inserting the spirally wound-up mat inner screen component into an outer mechanical support screen;

FIG. 23 is a sectional view taken as on the line and in the direction of arrows 23–23 in FIG. 22;

FIG. 24 is similar to FIG. 23 and is a fragmentary enlarged vertical sectional view of the device of FIG. 22 taken at substantially right angles to the view of FIG. 23, illustrating the machine with the wound-up inner screen and mat assembly positioned within an outer mechanical support screen;

FIG. 25 is a horizontal sectional view taken as on the line and in the direction of arrows 25–25 in FIG. 24;

FIG. 26 is a schematic representation of various process steps of a method of the invention for formation of tubular filters and flat filters;

FIG. 27 is a longitudinal sectional view of the completed tubular configuration filter comprising an inner perforated member, a metal fibril compact filter media, and outer mechanical support perforated member and with finishing end caps in place on the filters;

FIG. 28 is a schematic representation of the steps of another method of the invention for compacting a mat, such as that shown in FIG. 14 into a dense fibrous metal component which can, for example, be used as in transpiration cooling device or for other uses; and FIG. 29 is a schematic representation of another method of the invention, illustrating the single step compression of a low density fibril supply, such shown at the left in FIG. 26, for forming a high density finished component.

Throughout the drawings corresponding numerals refer to the same parts or elements.

Referring now to the drawings the discussion will deal first with the unique fibril metal starting materials which, according to this invention, are used for the construction of fibrous meal compacts of many descriptions. The fibril metal starting materials and the machines and methods for their production are the subject of an application of Bertil J. Sundberg, Ser. No. 391,707, filed Aug. 24, 1964, executed Aug. 21, 1964 and entitled Metal Product and Method and Machine for Making Same, to which reference is made for a full delineation of the fibril metal starting materials used herein. For completeness however, such unique starting materials are described herein, as follows:

FIBRIL METAL STARTING MATERIAL

The basic component of the fibril metal compacts forming the product of this invention is, of course, the fibrils themselves. FIG. 1 is a photograph magnified twelve times showing representative metal fibrils used in the preferred embodiment of the invention. From FIG. 1 it can be seen that these fibrils are elongated in respect to their cross sectional dimensions; they have a slight twist throughout their length. The light and dark spots on the fibrils show this twist. It can also be seen that the fibrils are uniform in lengh and are of substantially uniform cross section.

Although for the purposes of photography the individual fibrils 49 shown in FIGS. 1, 2 and 3 were held between glass slips and thereby physically maintained in a common focal plane, the fibrils 49 when released will have a springness and due to their slight bends, they will, when randomly oriented in a bulk supply, display a good but not excessive amount of "loft." That is to say, a pile of the fibrils will stand resiliently, without packing and with little development of parallelism between adjacent fibrils. Individually, the fibrils are resilient, they have some but not excessive, bends.

The fibrils shown in FIGS. 1, 2 and 3 are made from Type 347 stainless steel, and are illustrative of the extremely tough and recalcitrant fibril starting materials which may be uilized pursuant this invention. By the terms tough and recalcitrant is meant materials which cannot readily be machined with ordinary cutting tools. Before the aforementioned invention of Bertil J. Sundberg, it was never possible to make at any economical cost, a metal wool of, for example Type 347 stainless steel. There just was no economical way to make "wool" from Type 347 stainless steel.

We do not mean to imply that Type 347 stainless steel is the only tough material that may be utilized pursuant this invention. There are many other tough metals and alloys and the selection will therefore depend upon the characteristics desired, i.e. density, corrosion resistance, heat resistance, heat and electrical conductivity, abrasion resistance, etc.

The present invention is also applicable when, a fibril starting material is used which has the configuration and other characteristics of that herein described for the tough, recalcitrant metal fibril materials but is composed of more easily machinable metals (i.e. ordinary steel and its alloys, non-ferrous metals), but in such event, some of the cost advantages as compared to other available methods will be lost. However, many advantages of the invention such as freedom from substantial amounts of detached burrs, slivers, chips and degradation particles, good loft, uniformity in respect to port size and distribution (and hence uniformity of density of the finished products) pore shape, convenience of manufacture, etc. are still retained.

In some instances homogeneous mixtures constituting the fibril starting material may be used. Examples of these include but are not limited to fibril mixtures of ferrous and non-ferrous materials, or fibrils made from coated metals or bi-metals, homogeneous mixtures of metallic and non-metallic fibrils.

Pursuant the aforesaid application of Bertil J. Sundberg, the original material is rolled to a very thin strip and is cut into strips, then the fibrils are severed as very thin strips of rolled strip by a succession of short shear-like tool blows of extremely short time-duration but of immense energy, one fibril being severed from across the end of the strip for each such shear-like tool blow. The fibrils so made are of uniform length and of hair-like dimensions. They have faces corresponding to the rolled faces of the strip and fractured faces. The fibrils are of small cross-section, usually much less than the cross-section of a .002 inch wire. As made, they are slightly to moderately bent along their length and they have a slight to moderate twist. They have a tensil strength which, as nearly as can be determined, approximates that of the parent material. A bulk supply of such fibrils is substantially free from detached burrs, chips, slivers and degraded particles, but will (when viewed under the microscope) exhibit some roughness and an occasional attached burr and exhibits roughness on the fractured faces of the fibril and along the edges of such face. The cross-secitonal shape of the fibrils of one batch may include some which are like a squashed rectangle having two opposed angularly disposed nearly straight boundaries (apparently corresponding to the rolled faces of the strip from which the fibril was severed), said faces being connected by an inwardly roughly curved minor length boundary and an outwardly curved major length boundary (apparently corresponding to the fractured faces of severance). In some instances the minor length inwardly curved boundary will nearly disappear, in which event the cross-section approaches a triangular shape. Reference is made to the aforesaid application of Bertil J. Sundberg for additional microphotographs and description of the fibril starting material.

FIG. 2 is a photograph of the fibrils enlarged eighty times. It can here be seen that the fibrils 49 have two smooth faces and two sheared or severed faces. The smooth faces apparently correspond to the opposite rolled faces of the foil strip from which the fibrils are cut and the severed faces apparently are those resulting when the fibrils are severed from the ends of the strip. In the photograph of FIG. 2 the curl and twist of the individual fibrils is clearly evident and the above described physical characteristics of the fibrils can be seen. Note that the severed faces appear rather irregular and rough on the faces and along the edges. The rough edges on the fibrils are believed to act analogously to the scaly surface of natural wool fibers and are believed to be responsible for the favorably high green strength of compacts made from the fibrils. Also, these surface and edge irregularities are believed to assist in trapping dirt and other small particles when a densified compact is used as a filter.

These same surface and edge irregularities are believed to improve the bond between the fibrils when they are compressed into compacts, and to assist in making firm attachment when the compressed compacts are brazed or sintered. The increase in surface area due to the surface and edge irregularities are also useful in extending any phenomena requiring a solid-fluid interface, as where a compact composed of such fibrils is used as or for holding a catalytic element in chemical reactions.

For size comparison FIG. 2 includes a .001 inch round wire. This is shown at 30 in FIG. 2.

FIG. 2 also illustrates some of the types of contacts which occur between fibrils when they are in contact with each other. At 31 there appears to be a substantially flat face-to-face contact while at 32 there appears to be an edge-to-edge contact. It will be noted that the fibrils are substantially free from slivers, burrs, chips and detached particles of degradation.

When the fibrils are placed into a loose pile and pressed between glass slips, as shown in FIG. 3, they will intertwine, cross, and interconnect in the widest variety of ways. When released from pressure the mass will always be three-dimensional inasmuch as the fibrils have good loft, they are springy (prior to annealing) and are irregularly oriented and project in every direction. The random orientation of the fibrils is clearly evident in this photograph, FIG. 3.

For most purposes, and as an example of smaller size fibrils used in this invention the fibrils may be very fine, nearly hair-like. For example they may have a cross section wherein one transverse measurement through the section is .0015 inch and another measurement through the cross section may be, say .0009 inch or even less, for example down to .0005 inch. The length of such fibrils might be ¾ inch. The cross sectional dimensions of the fibrils can, of course, be increased as can the length. Usually the largest cross sectional transverse dimensions will be under .005 inch on down to say .0009 inch and even lower, say .0005 inch. The length will usually be about 0.5 inch to about 1.5 inch, but longer or shorter lengths can be used. Fibrils of such dimensional parameters give good results in this invention.

METHODS IN GENERAL

A supply of fibril starting material of the aforesaid kinds and characteristics, having been obtained, it is then processed through a plurality of steps which are carried out with appropriate machines, several of which are used. The invention provides several methods and a variety of machines. Different machines may be used and some may not be needed, depending upon the particular final product desired.

In general the methods of this invention comprise compacting the fibril starting material, which in bulk may have a density of 1% or less of the solid material of which the fibrils are composed, until the density is increased to that desired in the final article, which may be as low as for example 5% to 8% up to as high as, for example, 75%–90%. The compaction is accomplished in a non-liquid environment, preferably but not necessarily in several steps and preferably but not necessarily with one or more intermediate annealings. There are many advantages inherent when the working environment is non-liquid, not the least of which is low cost and freedom from involvement of the fibril material with anything foreign to the ultimately desired finished article. By using successive steps in compacting the fibrils it is possible to introduce layering as a parameter and this helps to avoid channeling and permits variable density objectives to be easily obtained; hence multiple step compaction is preferred. By using intermediate steps of annealing (between successive compactions) the material, even though of the toughest metals, can usually be brought to high, even extreme, densities and intermediate annealing is preferred.

It is a feature of the invention that the bulk fibril starting material, being initially clean and substantially free from detached burrs, slivers, chips and degraded particles, is maintained clean during the vulnerable phases of subsequent processing. This is accomplished by introducing separated fibrils into an upwardly moving stream of high velocity clean air by which they are transported by the air stream and into contact with a preferably downwardly facing reticulated web, against which they build up and form a mat which is a low density composite of high-velocity impinged, interlaced, randomly disposed fibrils. The mat, even though of the very lowest density at this stage (around 1% density as compared to an equal volume of the material of which the fibrils are composed) will have a strength sufficient to retain its integrity and it will cling to the underside of the web of its formation meanwhile being substantially cleaned of any unattached particles of degradation (burrs, chips, slivers, etc.) or maintained clean by the through-passage of the high velocity airstream used in its formation. The fibrils can of course be combed out to disintegrate the mat and, preferably this is done once more and the mat reformed by upward or downward high velocity airstream.

In either way, using a one stage or a two stage mat-formation will provide a usable very low density fibril-composed homogeneous mat substantially free from separate particles of degradation, having sufficient strength (i.e. "green strength") for subsequent handling and of uniform density throughout. Two stages of mat-formation are preferred.

Then, depending upon the ultimate article being produced, the mat may, in appropriate sized pieces be laid in layers and compressed or it may be rolled up as a cylinder and compressed, either with or without one or more steps of intermediate annealing. Also, the compressive pressures may be increased for successive layers, or in successive stages. The mat may be compressed against a woven screen of the same or another material (as the fibril material) and compressed.

In a final stage the composite is subjected to temperature sufficient to weld the fibrils where they are in contact, (or at least increase the bond between them) or, if a brazing ingredient fibril has been included, to braze them together. Where the final compaction is against a woven screen, attachment will be attained between the compacted fibrils and the screen, due to the final heating at elevated temperature.

METHOD OF FORMING MATS OF FIBERS

One illustrative embodiment of a machine for forming mats from the fibril starting material, is illustrated schematically in FIG. 4. FIG. 4 is actually a schematic representation of a machine made by Curalator Corporation, East Rochester, N.R., their Model No. 18–BS. Since FIG. 4 is schematic it should be considered only as illustrative of the kind of machines used in carrying out a process of the invention. The particular elements can be varied to meet the varying circumstances. The machine includes an outer housing-frame generally designated 50 which forms a hopper and serves as a frame for various components of the machine and supplies the mechanical structure. Housing 50 has a hopper portion 51 with a large hopper loading opening 52 at one end thereof.

The hopper 51 has a bottom movable conveyor belt 53 mounted on suitable end rollers 54, 54. One roller can be driven through any suitable adjustable speed drive, in the direction indicated by arrow 55 to move the bulk supply 62 of metal fibrils slowly toward the rear part of the hopper so that the pile of fibrils will engage the upwardly moving front run 60 of conveyor 56. The conveyor 56 is mounted on a pair of spaced apart vertically spaced rollers 57, 57 which are rotatably mounted on the frame 50 and driven through suitable adjustable speed drive mechanism (not shown). The conveyor 56 which has outwardly extending needle-like teeth 61, and as the front run 60 move upwardly, the teeth 61 disengage fibrils from the adjacent face of the pile 62 of fibrils, and transport the fibrils upwardly as indicated by arrow 63.

At the upper end of the upright or vertical conveyor 56 the fibrils carried by teeth 61 are engaged by teeth 64 on an upper horizontal conveyor assembly generally designated 65. The teeth are mounted on a belt 66 which is mounted on suitable rollers 70, 70 which in turn are driven by an adjustable speed mechanism (not illustrated). The rollers 70 are rotated in the direction of arrow 71 so that the teeth 64 move oppositely to the direction of travel of teeth 61 on conveyor 57. Thus teeth 64 comb down and level out the flow of fibrils as they are transported upwardly by conveyor 57 and in so doing help to maintain a uniform flow of fibrils illustrated at 72, as the fibrils are carried over the top of the upright conveyor 56.

In the center section of the machine, illustrated generally at 75, the housing 50 is formed into an elongated tunnel-like throat of decreasing cross-section toward the right of FIG. 4. In this throat are placed a pair of spaced-apart rollers 76, 76 which are rotatably mounted. The rollers serve to mount a reticular endless belt 77 which is mounted so as to run on the rollers. The belt 77 is driven so that its lower pass moves to the right as shown by arrow 73 when the rollers 76, 76 are rotated in a conventional manner by suitable adjustable speed power mechanism (not shown).

As shown in FIG. 4, the wall 80 of the center section 75 of the machine has a large rectangular rear air-outlet 81 cut therethrough. The port 81 opens into the interior of the center section 75 and between the upper and lower runs of belt 77. A suitable duct 82 is connected to the port 81 and also to the intake side 83 of a suction blower 84 which is driven through a suitable motor 85.

The suction blower 84 is of a high capacity and evacuates air from the tubular center section 75 of the machine. Most of the air will enter through opening 52 of hopper 50 and then pass around through inlet end 86 into section 75.

It can be seen that the opposite (right) end of the center section 75 is substantially blocked off from entrance of air by a nest of rollers at 91, and by the right end roller 76 and belt 75. Sealing strips 87, 87 extend down from the top of center section 75 and almost to those portions of belt 77 where the belt passes over rollers 76, 76. By these expedients the opportunity for air to by-pass the path of flow through the lower run of belt 77 is decreased.

Air will therefore flow into hopper 50, thence through opening 86. At opening 86 the flow is via arrow A1 down through the space between the back (right in FIG. 4) side of upper roller 57 and the adjacent roller 76, as shown by arrow A4, and in so doing the air flow assists in dislodging from needles 61 on conveyor 57 the flow of fibrils that have thereby been separated from bulk supply 62. The airflow A2–A4 is strong, and turning upwardly and to the right (FIG. 4) carries the hair-like fibrils along with it and as the airflow passes through the lower run of belt 77, as at arrows A3 and A4, the fibrils are intercepted by the net-like belt, while the air passes through the belt, and into opening 81 at arrow A5 thence via arrows A6 and A7 through blower 84 and are then exhausted at A8. Un-attached degradation particles (burrs, chips, slivers, dirt, extraneous material) if any, are carried along with the air and are hence removed from the fibril mat, which is meanwhile built up on belt 77 and held there by the airflow.

The lower pass of belt 77, moving to the right, arrow 73, carries the fibril mat to a place 95 where a plurality of small rollers indicated generally at 91 very gently compact the mat and support the mat until it engages a stripping roller 92 which is powered to rotate in direction as indicated by arrow 93.

The roller 92 engages that side of the mat which has been towards belt 77 and gently guides the mat under roller 92 and along floor 90 to and under feed roller 94.

The mat of fibrils will thus be impelled by the rollers 92 and 94 out over the end of floor 90 where it emerges. The rollers 92 and 94 are rotated under power by suitable means (not shown) in a substantially cylindrical chamber 95 which houses a high speed breaker roller 96. Roller 96 is what is called a "lickerin roll." The lickerin roll 96 is rotated in the direction indicated by arrow 97 as at extremely high speeds by a suitable drive (not shown). The outer peripheral surface of the lickerin roll 96 is provided with a plurality of forwardly directed sickle-like sharp pointed teeth 100. These teeth, moving rapidly across the approaching end of the mat, tear the metal fibrils loose, separating them loose from the mat and thus loosened fibrils are projected as individual fibrils onto a venturi chute 101 leading from the chamber 95. Below and slightly to the left of the lickerin roll 96, as shown in FIG. 4, there is provided a roller 107B which is rotated in the direction of the arrow shown thereon (clockwise). This roller closes against the adjacent lip 107A of the air duct 107 and the proximate upper edge 101A of the lower wall 101B of venturi duct 101. The upper portion of the roller 107B (which is the portion clockwise from lip 107A to edge 101B) acts as a closure from the lip to the edge and it is between such surface of roller 107B and the proximate surface of the lickerin roll that the very high velocity air flow and the dislodged fibril will flow.

The venturi chute 101 is expanded in direction away from the lickerin roll. At the bottom end of chute 101 there is rotatably mounted a condenser roll 103 which is made of a reticulated metal or woven wire cloth, and is driven by an adjustable speed drive in a clockwise direction as shown by arrow 103A. The condenser roll 103 is rotatably mounted in a housing and the center of the condenser roll is evacuated with a vacuum blower 104, drawing through the surface of roll 103 operating through a conduit or duct 105 which communicates with a stationary duct 105A in the interior of the condenser roll. The roll 103 is mounted so that it rotates with respect to the interior duct 105 and air is drawn through the chute 101 and through the condenser roll 103. The vacuum blower 104 pulls the air through internal duct 105A thence through duct 105, blower 104 and the air is then either discharged or, after being filtered, it may be recirculated to duct 107 which conveys the air up to the space between lip 107A and the underside of floor 90. Thence an extremely high velocity of air is projected at arrow A9 towards and against the lickerin roll 96 and the flow of individual fibrils lossened thereby. The flow impells the separated hair-like metal fibrils downwardly through the duct 101 and against the exposed outer arcuate portion of reticulated roller 103 where the fibrils are intercepted and a mat built on the reticular surface of roll 103. The fibrils are diposed at random and in every conceivable orientation and due to their high velocity impact, are more tightly formed as a mat than on belt 77. The air passes through roller 103 and duct 105A to be recirculated or can be discharged and fresher drawn in.

This air flow carries the individual metal fibrils downwardly with a high velocity against the surface of the condenser roll and the impingement of the fibrils accordingly builds up a mat surface of fibrils which is interlaced and has good green strength.

The individual metal fibrils, which are thus intercepted by and retained on the outside of the condenser roll 103, are formed into a fluffy homogeneous mat 110. The mat 110 is removed from the condenser roll as the condenser roll rotates. It should be noted that the condenser roll 103 is mounted on a suitable shaft and driven from suitable adjustable speed power means (not shown), A stripper roll 112 which rotates clockwise as shown by the arrow thereon, is provided for lifting the so formed mat 110 from the condenser roll 103 for delivering it to the loading end of the conveyor belt assembly 113 which is provided for moving the mat away from the machine. Conveyor belt assembly 113 can be any standard conveyor belt mounted on a pair of rollers 114, 114 and is driven by any suitable adjustable speed drive, not shown so as to carry the mat away at the same speed as it is formed.

Since the individual metal fibrils are separated by the lickerin roll and carried at high velocity in an air stream and projected against the condenser roll the resultant orientation of the fibrils is completely random and the fibrils in the mat 110 thus generated are completely randomly oriented, intertwined and interlocked. The fibrils are not physically attached together but the edge and surface roughness of the fibrils, when so formed into a mat cause the fibrils to resist separation, and the mat, even though having a density of only 1% to 1.5% of the density of the metal of which the fibrils are composed, has exceptional green strength. The mat is light, lofty and of uniform density throughout.

The airflow passing through the mat as it is formed is at high velocity and any particles of degradation, i.e. burrs, chips, slivers extraneous dirt, etc., which are not actually attached to a fibril, will be drawn through the net-like surface of condenser roll 103 and hence removed from the mat. Hence the fibrils are actually vacuum cleaned twice, by the airflow A4 through the mat formed on belt 77 in the center section 75 again by the airflow at A12 through the mat as it is being formed on condenser roll 103. To insure cleanliness it is best, in most factory locations to filter incoming air supplied to the system, as at 107FN.

CHARACTER OF THE FIBRIL MAT FORMED

The mat which is formed by the process of this invention, as on the machine shown in FIG. 4, is an even strip of uniform thickness composed of fibrils uniformly distributed. The fibrils are laid and intersect each other in every conceivable direction. Three common modes of intersection are shown in FIGS. 5, 6 and 7 (as well as FIGS. 2 and 3). In these figures, the fibrils 49 which are made as previously described are shown as having a substantially edge-to-edge (or point-type) contact at 116 in FIG. 5; a substantially surface-to-edge (line-type) contact at 117 in FIG. 6 and a substantially face-to-face (area type) contact as at 118 in FIG. 7.

The edge-to-edge and edge-to-face contacts, particularly where roughness occurs provides excellent adherence between the contacting fibrils. The fiibrils cling together and resist separation. This is believed to be due, at least partially, to the roughness which causes the fibrils to hold together in much the same way as woll fibers hold together. Whatever may be the reasons, the resultant mat has sufficient green strentgh so that it is capable of being handled in various stages of subsequent processing, without disturbing the random orientation of the individual fibrils or disturbing the condition of uniform density of the mat from section to section in the mat.

The mat 110 coming from the machine (FIG. 4) has uniform density in all directions of about 1% to about 1½%.

During the subsequent compression and annealing of the mat the condition of uniformity of density (which is also to say, the uniformity of distribution and size of the voids) will not change. Even though the mat may be enormously reduced in volume and its density increased the condition of uniformity of density and uniformity of distribution and size of the voids, will not change. This uniformity property of the products of the invention is a valued feature of the invention. Just why it occurs is not fully understood but it is believed to be due to a condition of uniformity of the starting material (length, cross-section, degree of bend, degree of twist, springiness, loft) plus the exceeding almost hair-like fineness of the fibril starting material, plus uniformity in the gentle handle of the tiny fibrils in laying up the mat. In any event, the mat 110, even though of very low density, is of great uniformity, and absent subsequent rough handling, will preserve its uniformity (and all attributes flowing therefrom) when it is later on reduced to smaller and smaller thickness.

FIG. 8 is a fully size photograph of the top of a portion of a mat 110 made accordaning to a process of the invention and on the machine illustrated in FIG. 4. It can be seen that the individual metal fibrils 49 are oriented in every direction, curled together, and make every conceivable type of contact with each other. The mat is very porous, and has, in fact, a density of approximately 1% to 2%. For the purposes of this specification, density is defined as the weight of a unit volume of the mat (or compact) divided by the weight of the same volume of a solid metal of the same material as that used to make the fibers. Thus, where a given mass or volume of the mat or compact is said to be 2% density, it means that this volume of mat weighs 2% as much as an equal volume of the solid metal from which the fibrils are made. "Porosity" is 100 minus the density. Thus, a mat having a "density" of 2% has a "porosity" of (100% minus 2%) i.e. 98%.

Therefore, it can be seen that the mat coming from the machine is of low density, hence extremely porous; it is fluffy, and would easily tend to separate except for its excellent green strength which is believed to be due to the curling and twisting together of fibrils and the interlocking and intertwining of these fibrils so that the moderately rough edges of contacting fibrils will catch each other and engage to give to the mat the attribute of increased green strength.

A side view of the mat 110 shown in FIG. 8 is illustrated in FIG. 12. The mat has a good vertical height and the metal fibrils are uniformly disbursed and extend in all directions, transversely, longitudinally and vertically, and it is springy.

MAKING USABLE COMPACTS

In order to make a usable metal fibril compact, the fluffy, springy mat 110 is further processed. The first optional step in this further processing is an initial compression of the mat 110 into a mat substantially one-half as thick. This initially compressed mat 120 is shown in FIG. 9, which is also a top view. FIG. 13 is the side view. To accomplish the initial compression the mat 110 is carried on a strip of paper P. At this stage, the mat is tender, and the paper adds support for handling. As the mat is received from the machine (FIG. 4) it is simply rolled with a suitable roller so as to apply relatively low pressure to reduce the thickness of the mat about one-half and thereby provide a mat having a density of approximately two to four percent. This mat 120, FIGS. 9 and 13, has a density of two to four percent; it has an improved green strength as compared to the mat 110 received from the machine, FIGURE 4. Some of the metal fibrils in the mat appear to be bent beyond the yield point so as to take a permanent set. The contacts between individual fibrils are also strengthened and the fibrils are more firmly pressed into mating engagement with other fibrils with the various manners of contact shown in FIGURES 5–7. So the pressure is applied to the mat, even though gentle pressure, the fibril edges, being minute, will, it is believed, generate fairly large unit pressures, with the result that the edges of fibrils bite into other fibrils. The rough edges shown in FIG. 2 also give good adherence between contiguous fibrils. When supported on paper strip P, the mat can without deterioration, be rolled and unrolled for transport, storage and further handling. If two mat layers are placed against each other without being separated by paper they will adhere and cannot thereafter easily be separated.

The mat 120, after it has been rolled as shown, is then preferably passed into an annealing furnace where it is annealed at a temperature of substantially 2000° F. in a reducing atmosphere (hydrogen). Annealing causes the mat to settle, even without pressure being applied. After annealed, the mat appears as in the photograph FIG. 10 and may be placed upon a strip of paper for handling and storage. The side edges S—S of the mat have been trimmed. This annealed mat, designated 121, is shown in side view in FIG. 14. During the annealing operation the internal stresses of the metal fibrils are relieved, and the mat sags down simply due to its own weight. In other words, the density of the mat again somewhat increases (increase from about 1.5 to 2 times previous value), or in this instance to about four percent to about six percent. The mat structure at this stage appears to be more dense, as can be seen in FIG. 10 and the metal fibrils are still in a random pattern with the different interconnecting edge surfaces and the overlapping and intertwining of the fibrils giving a very substantial amount of green strength in all three dimensions. At this stage the mat can be stored, handled, shipped and processed without deterioration.

Thus the mat 110 coming off the machine, FIGURE 4, can immediately be compressed to the condition at 120, FIGURES 9 and 13, and this preliminary rolling is recommended, especially where the very low density mat 110 must be transported or perhaps stored before being annealed, to condition 121, FIGURES 10–14. After annealing the mat is very strong, before annealing it is, by comparison, somewhat weak, but still adequate. However if the conveyor belt 113–114 (FIGURE 4) is appropriately arranged, the mat 110 can be passed directly to the annealing step and and the pre-compression step (pre-rolling) may then be eliminated.

The annealed mat 121 is then ready to be processed in further steps which will vary in accordance with the desired end product being made. Two examples of what products can be made from, the compacts or mats of the invention, are more fully described herein. The final range of density will be from about 15 percent to 85 percent or even more, depending on the usage. Preferred ranges of density are specified in the examples, the first of which is now described.

CONSTRUCTION OF TUBULAR FILTER MEDIA

This example relates to a high pressure fluid filter for filtration of highly corrosive materials and other sophisticated uses requiring great strength and freedom from corrosion such as is provided by Type 347 stainless steel and the like materials. For these uses it has previously been the practice to provide filters made of very fine mesh woven wire screen. Very finely woven wire screening is expensive, of limited supply, and when used in a highly corrosive application or applications requiring great strength and reliability such as filtration of aircraft hydraulic oil, the fine screen has had to be made out of non-corrosive, high strength material such as Type 347 stainless steel. To get a fine screen requires a fine wire. Hence fine stainless steel wires woven together to make a screen becomes prohibitively expensive and can only be used where cost is no object. It has been found that moderate density metallic compacts made according to the present invention are of such uniformity that they can be used for such sophisticated filtering operations. The filters so made are of low enough price so as to make them a throw-away item. The density range and thickness of the compacts can be varied to provide variations in filtering efficiency, etc.

According to one embodiment of the invention there is still provided at least one layer of filtering woven wire screen final barrier for particles, but the filters of this invention are primarily pressure consolidated compacts of fibrils. The tubular inner screens use much less of the expensive filter screen material than the standard pleated screen design. Thus in an exemplary embodiment a length of annealed metal fibril mat is spirally wrapped tightly around an inner cylinder of woven wire screening of proper mesh to form a tube which is then further consolidated with pressure and then sintered into a compact body. The metal fibril compact actually performs the major work of filtration, the inner screen being mainly a factor of safety. For greater density in the final filter, the mat 121 may be prerolled after annealing, as shown in FIG. 14A. The mat is passed through a pair of rollers 119, 119 that are resiliently rigged together, much like a washing machine wringer. The rollers can be power driven in a suitable manner or can be hand cranked. A further major reduction in thickness can be achieved this way.

FIG. 15 illustrates a cut-length of uniform width mat after it has been annealed, and if desired further compressed as shown in FIG. 14A. The cut-length is designated 123 and it is of any length to provide one or several turns when wrapped on itself to form a tube. As shown, one edge of the strip 123 is lightly tacked by spotwelding it onto an inner tubular support 122 composed of woven wire screening. The strip 123 of annealed fibril compact material is left to hang free and is suspended from the inner screen 122. The inner screen and also the fibril compact are made of stainless steel, for example Type 347 stainless. The screen 122 is made of finely woven stainless steel wire of required mesh which is selected according to the particular use of the filter. The screen is relatively light in weight and does not possess much structural strength. Further, the screen 122 in itself will not meet filter specifications. It is too thin, not strong enough, it has too little capacity to effectively carry out the job of filtration.

Referring specifically to FIGS. 16–22, there is illustrated a machine for spirally rolling up the mat-screen component 122—123 of FIGURE 14 so as to lay up a plurality of turns of strip 123 in a uniform manner onto the screen 122. The inner screen 122 is mounted onto a suitable cylindrical mandrel support 124. Suitable end caps 125 and 126 are provided at the ends of the mandrel for holding the inner screen properly positioned. The end cap 125 has a shaft 127 integral therewith by which it can be rotated. The end caps 125 and 126 have flanges 128 which hold the screen cylinder 122 in position.

When the inner screen 122 with its attached metal fibril strip 123 has been properly positioned on the mandrel 124 the mandrel and screen are placed in a winding machine illustrated generally at 130, FIGURES 16, 17, 20 and 21. This machine includes a main frame 131 having a horizontal table 132, and a pair of spaced apart side plates 133, 133 mounted thereon. A pair of cylindrical steel rollers 134 and 135 are rotatably mounted in suitable bearings 136 on side plates 133, 133 and extend between the two side plates. The centers of rotation of the rollers 134 and 135 are fixed and so positioned that the inner screen 122 with its mandrel 124 will ride upon the outer surfaces of the rollers when the component 122–124–123 is placed between these rollers as shown in FIGURES 17, 20 and 21.

A pair of upright supports 140, 140 are mounted on the side plates 133, 133 and extend upwardly therefrom. A pair of outwardly extending, parallel, spaced apart arms 141, 141 (see FIGURES 16 and 17) are drivably mounted onto a shaft 142 which in turn is rotatably mounted in suitable bearings 143, 143 on the uprights 140. The shaft 142 extends between the upright supports 140. A pressure roller 144 is rotatably mounted on suitable bearings 145 in a position between the outer ends of the arms 141, 141 and with the axis of roller 144 parallel to the axes of rollers 134 and 135. The roller 144 is above the rollers 134 and 135, as can be seen in FIG. 17. A crank arm 146 is also pinned to shaft 142 by pin 147. The control arm 146 extends rearwardly from the main frame 131.

A fluid actuated cylinder assembly 150 has its base pivotally attached at 152 on lower bracket 151 on frame 131. A double acting piston in cylinder 150 has piston rod 153 pivotally attached at 154 to the outer end of crank arm 146. The double-action cylinder is controlled by fluid pressure through hoses 155 and 156 which extend back through position (Up-Off-Down) control valve 157 so that the rod 153 can be extended or retracted under pressure.

The fluid supply is air and a suitable pressure regulator 160 is located in a supply line 161 from a source 162. See FIGURE 16. The regulator 160 is utilized for maintaining a uniform (but adjustable) pressure at the control valve 157 so that a known pressure can be introduced into cylinder 150 so as to exert a known force on the rod 153 for exerting a known force on the pressure roller 144.

When the winding machine 130 is empty, the valve 157 is set so that the rod 153 is retracted and the arms 141, 141 are in the "open" position as shown in dotted lines at 163 in FIG. 17. The roller 144 is thus raised above rollers 134 and 135. The inner screen 122 on its mandrel 124 with the end caps 125 and 126 in place is then placed on top of the rollers 134 and 135 and between the rollers with strip 123 extending forwardly from under the mandrel 124 and then hanging freely down over and in front of lower front roller 134. Since rollers 134 and 135 are spaced slightly apart, the screen 122 will rest on top of both these rollers. The shaft 127 on mandrel 124 has a suitable drive pin 166 mounted therein and this drive pin is adapted to fit into a slot 167 on the drive portion of a flexible coupling 168. The flexible coupling in turn is mounted onto a shaft 169 which is telescopically splined on coupling 170 which in turn is drivably mounted onto the output shaft 171 of a gear speed reducer 172. A spring 175 is provided for urging the two couplings 170 and 168 apart so that the groove 167 always engages the pin 166. The speed reducer 172 is driven by an adjustable speed electric motor 176 which is mounted on the reducer. When the motor 176 is energized the output shaft 171 of the speed reducer will rotate and drive couplings 170–168 and the shaft 127, thereby turning the mandrel 124 and screen 122 thereon. This causes the annealed strip of the fibril metal mat material 123 to be rolled onto the inner screen 122, since the mat is tack welded to the screen. Before the rolling-in of the strip 123 is begun, valve 157 is operated, and the air pressure is adjusted at 160 so as to force roller 144 with a predetermined pressure down upon the inner screen 123, as shown in FIG. 17. Motor 176 is then started and the mandrel 124 and screen 123 are thus rotated in direction as indicated by arrow 177; FIGURES 21–22. The strip of mat 123 will then start to wind up tightly around the screen 122 as shown in FIG. 20.

It will be observed that the strip of mat 123 will fit tightly against the screen because the line of contact between the rollers 134, 135 and 144 and the screen will be under a substantial and steady pressure. Therefore as the mat 123 is drawn in and wound on screen 122, for example as the first revolution as shown in FIG. 20, the actual line-areas of contact between the pressure roller 144 and rollers 134 and 135 with the mat will extend as three line-like areas where each of the rollers contact the mat strip 123, one such area (between roller 144 and the mat strip) being indicated at 178.

There are similar areas of contact where rollers 134 and 135 contact the mat strip 123. It should be noted that the pressure on rollers 134 and 135 together will support the load from the pressure roller 144 and therefore the actual pressure on the metal fibril compact or mat will be greatest right directly beneath the pressure roller 144 in the area 178 but all rollers contribute to the pressure compaction of each layer of the mat-strip 123.

As the mandrel continues to rotate, additional layers of the mat-strip 123 will be laid on, each succeeding layer tightening down upon the layers below. There is no tension on strip 123 as it is wound in.

The rolling-in of the mat-strip 123 is shown completed in FIGURE 21. It will be noted that the areas of contact of roller 144 and of rollers 134 and 135 with the outermost layer of the rolled up mat-strip 123 have increased in area. This is due to the fact that there is a greater radial depth of material into which the rollers can compress. The amount of pressure exerted by cylinder 150 can if desired, be caused to increase as the winding approaches completion.

The end of the mat-strip 123 will be rolled until it actually makes a smooth overlap joint with the underlying turn of the strip. This is possible because the strip 123 is quite thin and the metal fibrils are resilient and somewhat movable and will compress and shift as the mat-strip is being rolled up. The end of strip 123, which is of course exposed appears to be "ironed" smooth.

The completely rolled-up compact consisting of the inner screen 122 with the strip of metal fibril mat 123 rolled in layers thereon is then in some cases continued to be rolled under pressure from roller 144 against rollers 134–135, until compaction sufficient to provide the desired density is achieved.

As the areas of contact of the rollers with the rolled in mat increase, as mentioned relative FIGURE 21, the pressure per unit of area of contact will decrease and consequently each successive layer outwardly is compressed a little less than the one next below. This yields a slight decrease in density from inner to outer positions through the roll, with the most dense layer adjacent the inner screen 122 and successively less density at successively outward radial positions, it being borne in mind that in the finished compact the layers are practically indiscernable.

This is desirable in a filter since the progressively increasing density aids in the filtering action. Thus the largest particles to be filtered out will be entrained at outer locations in the compact and finer particles will be trapped toward the inner locations. This increases the capacity of the filter and increases the length of service life of the filter before it has to be cleaned or replaced. The length of the mat rolled onto the inner screen will be determined by the desired volume of the finished mat and the desired density of the filter. Exemplary filters will have a density range of 20 percent to 45 percent, preferably 25 percent to 35 percent, 3 to 15 wrapping turns, preferably 7 to 8 wrapping turns of the mat-strip 123. This may be with or without an inner screen 122.

After the cylindrical compact has been rolled onto the screen for a sufficient length of time to give the desired average density, the valve 157 is actuated to retract rod 153 and elevate roller 144. The assembly of mandrel 124, inner screen 122 and rolled on densified fibril metal mat 123, and the screen-rolled on fibril metal mat, collectively designated 199, are removed from the mandrel.

In some filters an inner screen 122 is not necessary, and in such event the mat-strip is wound directly onto a mandrel 124 to form a tubular shape as shown in FIG. 21. The leading edge of the mat-strip is attached to the mandrel by any suitable non-permanent and solvent removable adhesive or merely by adhesive tape, in order to start the first turn around the mandrel or the strip may be started by guiding it by hand through its first turn on the mandrel. The wound-up metal tubular shaped fibril compact has very adequate green strength.

The tubular compact, with or without an inner filter screen can be sintered to form bond between the fibrils or, if desired, may be inserted into a coarse outer screen and then sintered. In one preferred embodiment, the inner screen 122 is used and the mat 123 is spot welded to this screen for the initial wrapping. In such filters the densities and turns are as previously stated. For high pressure systems an inner structure member such as a perforated tube or spring can be provided to mechanically support the tube to prevent collapse.

MACHINE FOR PLACING INNER SCREEN AND METAL FIBER COMPACT INTO OUTER SCREEN

Where desired, the cylindrical compact of rolled-up mat-strip either with or without inner screen 122, such cylindrical component being collectively designated 199, may if desired be assembled in a coarse protective outer screen. The outer screen is merely for size control and protection of the filter medium. The inner screen mat assembly 199 can be sintered without an outer screen if desired. Then, by adding end caps, it can be used as a finished filter.

The inner screen with the mat of metal fibrils rolled thereon has a certain amount of resilience before final sintering. In order to place the inner screen mat into the outer tubular screen, the outer portions of the cylindrical rolled mat component 199 must be compressed so as to be slightly smaller in size than the outer screen so as to permit insertion of component 199 into the outer screen. This also insures that the metal fibril mat cylindrical component will have a predetermined average density consistant with the end requirements of the filter.

Referring specifically to FIGS. 22–25, there is shown a machine 184 for inserting a cylindrical fibril metal compact 199 (with or without an inner screen 122) into an outer screen. The machine for placing the cylindrical compact 199 into the outer screen includes a main frame 185 which has a work table 186 supported thereon. A fluid actuated cylinder 187 is mounted by pin 188 on a pair of ears 189, 189 which are on frame 185. The cylinder 187 is a double acting fluid cylinder of a commercially available type and has piston and piston rod 190 which is actuatable up and down by the piston (not shown) in response to the pressure within one or the other end of the cylinder. The upper end of piston rod 190 has an adapter 191 attached by pin 192, the adapter in turn having a threaded stud 193 integral therewith. The threaded stud 193 extends axially with respect to the piston rod 190 and a pilot mandrel 194 is threadably attached to the stud, as an axial extension. The pilot mandrel 194 has a first section 197 which is of substantially the same outside diameter as the inside diameter of the coarse woven wire outer screen 198 into which the cylindrical fibril component 199 is to be inserted.

The rod 190 is guided by a cross-head 200 which is clamped to the upper end of the rod and extends as at 201 through a slot 202 in the upright section of the frame 185. The bracket 200 in the slot holds the cylinder in proper position. A stop block 207 is adjustably mounted in the slot 202 below the bracket 200. A stop bolt is adjustably mounted in bracket 200 and contacts a block 207 to prevent the piston rod from traveling downwardly too far.

The mandrel 194 in turn, passes through an opening in the bottom portion of an insert die 203 which is made in two section 205 and 206. The insert die is substantially cylindrical and has a cylindrical opening 204 through it which is of size to receive the outer diameter of outer screen 198. The lower portions of the die sections 205 and 206, respectively are pivotally connected to each other as at 210 so they can swing open. Each of the die sections has an upper tapered portion 211 which together form a conically shaped outer surface, as shown in FIG. 23, which fits into a mating conically shaped opening 212 in the table 186 of the frame. The two die sections 203 and 205 are inserted through the opening 212 in surrounding relationship to the mandrel 194 and are held together when they are in their down position by the conically shaped surfaces and the mating seat in the opening 212. In this position, as shown in FIG. 23, the die section 205 and 206 are held together and form the cylindrical center opening.

The table 186 has an upper guide member 213 mounted thereon as shown in FIG. 23. The guide cover member 213 provides a center opening sufficient to fit, with a slight amount of clearance shown at 214, over the die sections 205 and 206 which can be therefore lifted upwardly slightly by the amount of clearance 214. The upper portion of the two die sections can therefore be lifted a little to separate them about pivot 210 before they contact the seat 212. This slight separation aids in inserting the outer screen 198 into the opening of the dies when the die is to be used.

The mandrel 194, also, has a second upper section 215 which is of smaller diameter than the first section 197 and is made to fit inner cylindrical space of compact 199. This is illustrated in FIGURE 23, as including screen 122, but as noted above, such screen is optional only. As shown in FIG. 24, the upper end of the second section 215 has a bayonet slot (rather a groove) illustrated in dotted lines at 215 defined therein. This groove is used for locking on a collar 217. Collar 217 has a pin 220 which is fitted into the groove 216 and when the collar is slid on and turned it is locked in place to hold the component 199 in place on portion 215 of the mandrel 197.

When the unit is to be used, the fluid cylinder is in its normal position, as shown in FIG. 23. The outer screen 198 is dropped over the first section of the mandrel 197. If necessary, a tapered adapter guide can be placed on the second section 215 to guide the outer screen 198 over the shoulder at 221. The two die sections 205 and 206 can be raised up slightly so that they are separated to make easier the insertion of the outer screen of the dies. The outer screen 204 will fit against a small shoulder 222 at the bottom of the opening in the dies.

With the outer screen properly positioned in its die 203 and with the die 203 properly seated in the tapered seat 212 and a collar or sizing die 223 placed over the upper end of mandrel 197 as shown in FIG. 23. As shown in FIG. 23, the sizing collar 223 seats down against the upper surfaces of the die 203 and surround the upper section of the mandrel 207. It will be noted that the collar 223 has an internal opening 224 which tapers from its upper entrance mouth at edge 225 to its lower edge. At its lower surface of the collar, the diameter of opening 224 is smaller than the inside diameter of the outer screen 198. The bottom portion 224 of the mandrel fits snugly on the mandrel 197, with very little clearance. The inner diameter of the outer screen 198 fits around mandrel 197 with more clearance.

Next, the fibril mat component 199 is slipped onto the upper section 215 of the mandrel 197. The fit between the inner surface of the component 199 and the upper section 215 of the mandrel is quite close but the inner diameter of component 199 is such that the component will slide over the mandrel section 215 without difficulty.

The collar 217 is then put on and locked in place at the upper end of the mandrel section 215. The unit is then ready to be actuated to pull the inner component 199 downwardly through die 203 and then into the outer screen 198.

The fluid cylinder 187 is controlled through a suitable control valve 226. The valve is moved to an appropriate position retract, i.e. pull, mandrel 197 with component 199 on it downwardly in direction as indicated by arrow 231, so as consequently to force on the component 199 through collar 223. In so doing the outer surfaces of the fibril metal constituting component 199 will be compressed as it passes through the tapered surface of the opening 224 and thus size the outer diameter of the component 199, and thus sized it is drawn into screen 198. The mandrel move to the position shown in FIG. 24, wherein the fibril metal mat component 199 is pulled completely into the outer screen. The stop bolt 208 and block 202 are adjusted to prevent pulling the component 199 too far downwardly. It should be noted, as previously stated, that the tapered surface of opening 224 and collar or sizing die 223 will compress the mat on the outside of the inner screen a sufficient amount so that it will be inserted into the outer screen. The metal fibrils will have a sufficient resiliency so that they will spring back so as solidly to engage the inner surface of the outer screen once they are placed therein. However, the compression recovery rate for the metal fibrils is somewhat slow and therefore the entire unit 199 can be fully inserted into the outer screen 198 before the unit 199 is held solidly by its resilient recovery. Once the cylinder has completed its downward stroke, so that the inner screen and mat assembly 199 is completely within the outer screen 198, the valve 226 will be moved to position to return the piston rod to its upper position carrying along with it the mandrel 194. The dies 203 left, separate a little and release outer screen 198 and consequently the whole filter assembly 238 comprising the rolled up fibril metal mat 199, now much compressed and optionally including inner screen 122 in place within the outer screen 198.

The collar 217 is then removed and the filter assembly illustrated at 238 is then taken from the machine.

SINTERING

According to this invention, after the fibril metal compact is shaped and pressed to its final configuration, such as compact 238 in the preceding description, the compact is then brought up to sintering temperatures to cause an even firmer bonding between the fibrils and (where used) of the fibrils to the supporting screens. Thus for example, filter unit 238 is placed in an oven at 2200 degrees Fahrenheit in a hydrogen atmosphere for a sufficient time period to form autogenous bonds between the contiguous fibrils at their points of contact with each other and at the same time form at least weak autogenous bonds between the fibrils contacting the inner screen (where used) and those contacting the outer screen. The time of sintering is about one hour. When sintered the compacted fibril product has excellent bonding between fibrils, which can, however, be torn from each other, if the compacting is not too great, as in filters. When the compacting approaches 65% density or more, the final product superficially at least, looks like a piece of metal.

Regardless of the degree of compaction, the voids appear to be uniformly distributed and because of the nature of the original starting material, having some smooth and some rough surfaces, the filtering efficiency is very high.

VARIOUS PROCESSES AND PRODUCT EMBODIMENTS OF THE INVENTION

In FIG. 26, schematically illustrates, with various embodiments of the processes of the invention and resultant fibril metal compacts as a pile of metal fibrils 49 having the characteristics herein described is first processed in a machine such as exemplified in FIG. 4 to yield a metal fibril mat 11. Then the mat is initially compressed slightly as shown schematically at 240 or at 240A to increase its density. When making a tubular filter this is to increase its green strength and to improve the multitude of engagements of contiguous fibrils, thus yielding a mat 120 as previously described. After compressing, as at 240 or 240A the compacted mat is annealed to relieve internal fibril stresses and is ready for additional processing.

In making tubular filters, after the initial annealing of the mat at 241, FIG. 26, the mat is still of uniform density, since the random homogeneous orientation of the fibrils of the original mat 110 at FIG. 4 has not been disturbed. The mat can then be processed in a number of ways, as shown schematically in FIG. 26.

The mat 121 may be rolled with a roller 119 to increase its density as previously described. This step is optional and depends on the particular range of density desired in the final filter product. Other process embodiments including the following:

(1) A cut length 123 of the strip of mat 121 can be rolled into a cylinder (with or without an inner screen 122) as described yielding product 199. The density is controlled by adjustment of the pressure of rolling. The compact 199 exhibits a slight density gradient from inside decreasing in density to the outside. This forms the fibril metal compact 199.

(1a) The fibril metal compact 199 can be directly sintered at 242 without further processing to form a filter compact, with or without screen 122. This is a usable end product.

(1b) The fibril metal compact 199 can be inserted into an outer screen, for example, in machine 184, to form the filter assembly 238 as described and then sintered. The resultant sintered object is a usable end product.

(2a) A cut strip of mat 121 can be rolled into tubular form to the proper size and density without an inner screen to form a tubular metal fibril compact 232.

(2b) The tubular compact 233 can be sintered directly to form a usable fibril metal tubular compact composed solely of fibril metal, a filter element, for example, or a fibril metal tubular sleeve, to replace woven wire screens such as 122 and 198 herein described.

(2c) The tubular compact 232 can be inserted (either by hand or with suitable machines) into an outer cylindrical screen of proper size and this assembly 234, sintered to form a usable fibril of a tubular compact and an outer support screen. This is a useful end product.

(3) In making flat compacts layers of the mat 110 are compressed after several sections are laid up one on top the other and compressed to form flat filter element and annealed as at 241A. The annealed compact is then compressed to the desired density and then sintered to make transpiration cooling mats, structural elements and for various purposes. If necessary the flat compacts can be further annealed and compressed in alternating steps and when the desired density is achieved, the unit is sintered. The formation of an exemplary form of transpiration cooling mats is described in greater detail later in this specification.

After sintering the tubular filter elements to form bonds between the individual fibrils at their junctions, end caps or other mechanical appliances can be placed on the filters as shown in FIGURE 27. Also the units (199, 233, 238, after sintering 242) can be machined to size, as by end trimming, facing off, etc., or further processed as desired. The mechanical strength obtained from the superior bonds created between the fibrils during sintering provides a structurally strong machinable compact of good integrity which can be further processed without destroying the usefulness of the compact.

TRANSPIRATION COOLING MATS

An exemplary embodiment of the invention utilizes the metal fibril mats 110 shown in FIGURE 26. A transpiration cooling mat may be used for cooling extremely hot surfaces for example rocket components, the nozzles of jet engines, etc. These mats are dense but porous metal. Density is in the range of about 65% to 85%, preferably about 70% to 80%. The metal is therefore porous, but it must be uniformly porous. By forcing a coolant through the dense metal mat it cools the part and when the coolant reaches the hot side it evaporates and further cools the hot surface.

In the manufacture of such mats, it is extremely difficult to obtain a high uniform density. This is accomplished by the present invention by utilizing the uniform fibril metal mats 110. These are of uniform density throughout the mat and remain uniform even though the density is increased by extreme compression. The pore size appears to be of equal importance and this likewise is achieved by this invention. Uniform pore size is achieved even at these high densities with the fibril metal mats, made as herein disclosed. This is accomplished as follows: A plurality of pieces of green fibril metal mats 110, formed as disclosed, and having uniform density composed of Type 347 stainless steel, and with the fibrils having a length of ¾ inch and being about .0015 inch thick and severed at intervals of from about .0005 inch to .0009 inch along its length, said fibrils being of cross-sectional dimensions and shapes as herein described and illustrated and as illustrated in the aforementioned application of Bertil J. Sundberg, were placed into a mold as at 250 in FIG. 28 and the mold closed under available pressure from ram 249 to yield a densified structure 251. The mat sections tend to interlock to prevent later separation of the compact. A plurality of these structures 251 were stacked together and annealed at 252, FIG. 28, at a temperature of about 2000° F. in a non-oxidizing atmosphere.

In order to obtain uniform final density one must start with cut pieces of the mat material 110 of machine of FIGURE 4. The annealed mats 251 are then again placed into a compression mold 253 and again squeezed down to under greater pressure. This may provide sufficient density and the mat may be sintered to form bonds between the fibrils.

In certain cases the mats 254 must again be annealed and again compressed in press 253 with additional force to yield a thick dense metal object composed of metal fibrils. This is the final transpiration cooling mat 260 and is used as desired. Successive steps of squeezing and annealing (at least two compressions with intermediate annealing) can be used to obtain the required density in the transpiration cooling mat. The annealing of the mats in intermediate stages relieves the internal stresses in the fibrils and makes them more compressible. The final object (made of 347 stainless steel) may be sintered as desired, for example, one hour at 2200° F. in a reducing atmosphere.

FIG. 29 illustrates the comparative height between a pile of cut sections from the webbing machine, FIG. 4 (which makes a mat of uniformly dispersed, randomly oriented metal fibrils) and the final product after it has been compressed from about $\frac{1}{15}$ to about $\frac{1}{85}$ of its original height to produce a fibril metal product of the desired density. This is shown schematically in FIG. 29. The original height A represents the loose mats while the dimension B represents the compact after compression. Depending on the density of the original pile and the final density required, the mat will be $\frac{1}{15}$ to $\frac{1}{85}$ of the original height. The density range is thus from about 15% to about 85% or more, assuming that the original mat has a density of around 1%. Because of the resilience of the metal it has been found that after initial compression at least one annealing of the compact is necessary before the product reaches its final density.

This is also shown schematically in FIG. 26. The mat 110 can be cut into proper size and placed in a suitable die and compressed. The mat will always spring back after a certain amount of compression regardless of the compacting force applied because of the internal stresses in the fibrils as they are compressed.

Annealing relieves these internal fibril stresses and permits further compaction to the desired density in most cases. However, if the mat again springs back, another annealing will again reduce the resiliency of the mat so that it can be further compressed. The annealing-compressing steps can be alternated as many times as necessary to obtain the proper density.

After the proper or desired density has been achieved the unit is sintered to form the autogenous bonds between fibrils. The final compact maintains the uniformity of density present in the originnl mat 110. Also as shown in FIGURE 29 the compacts can be formed on curves if desired. The loose mats can initially be formed on curved or cone-shaped dies and plungers if a great amount of curvature is present or the mat can be formed into a slight curve in the final forming stages if the curve is not too severe. The curved die 263 and plungers 264 can be used to form the slight curve in the plate.

Broadly the formation of the compacts include the following steps:

(1) Formation of a loose mat of uniformly dispersed, randomly oriented, intertwining metal fibrils of the kind herein elsewhere specified.

(2) Compress mat to density greater than that of loose mats.

(3) Annealing of the compressed mat to relieve stresses and reduce its elasticity.

(4) Compress mat to desired density (with rollers and other devices for tubular filter or presses for transpiration cooling mats).

(5) Optionally to alternately anneal and compress additional time if necessary to obtain desired density.

(6) Sintering to form bonds between the individual contact points of the fibrils.

The tubular filter assembly 238, FIG. 26, may be fitted with suitable end caps in order to seal the ends of the metal fibril compact and neatly finish the cylindrical composite at the inner and outer screens. The fitting of end caps is illustrated in FIG. 27 and can be attached by any known procedure, such as brazing, to seal the ends of the filter media. As shown in FIG. 27, the filter assembly 238 has end caps 244 placed at opposite ends thereof. These have small flanges which fit inside the inner screen and around the outer screen. The end caps 244 are then sealed around their peripheral edges, both inside and outside by brazing or welding.

The compacts of the present invention are of uniform density and when made of appropriate metal fibrils such as Type 347 stainless steel they will resist corrosion, and heat.

When compacts made of 347 stainless steel fibrils as described were tested they indicated no significant difference in tensile strength when tested in any direction through the compact, thus indicating that the fibril bonds in all directions and that the random orientation of the fibrils yields a homogenous condition throughout the structures.

Further, the mean pore size, when determined in accordance with the methods outlined in WADC Report No. 56–249, were shown to be independent of thickness of the compact thus indicating uniform pore size throughout the compacts. The calculated mean pore size varied with the density of the compacts tested and ranged from approximately 20 microns at a density of 70% to 50–55 microns at a density of about 30%.

The compacts can be brazed (i.e. for end caps) machined and otherwise handled like the parent metal. The tensile strength of the compacts vary with the density but in all cases extremely high values are obtained. This is believed to be due principally to the characteristics of the fibril metals, and to good contact between fibrils, resulting in strong sintered bonds.

As many widely apparently different embodiments of this invention may be made without departing from the spirit and scope thereof, it is to be understood that we do not limit ourselves to the specific embodiments disclosed herein.

What is claimed is:

1. A mass comprising a plurality of randomly disposed hair-like substantially solid metal fibrils, wherein said fibrils are substantially free from particles of degradation and air transportable, and wherein said mass has resilient loft, substantial uniformity of density and distribution of voids, handable green strength, and a density range of from about 1% to 85%.

2. The mass of claim 1 wherein said fibrils have a transverse dimension in the range of about .0005 inch to .005 inch.

3. The mass of claim 1 wherein said fibrils are of corrosin resistant alloy steel.

4. The mass of claim 1 wherein said fibrils are stainless steel.

5. The mass of claim 1 wherein said fibrils have a cross-sectional area less than that of .002 inch circle.

6. The mass of claim 1 wherein said fibrils have a slight initial twist and slight initial bend.

7. The mass of claim 1 wherein said mass comprises a plurality of layers.

8. The mass of claim 1 wherein said mass comprises a multiple layer wrapping composed of such randomly disposed fibrils.

9. The mass of claim 1 wherein each of said fibrils intersects one or more other fibrils within said mass and said fibrils are substantially attached at places of intersection.

10. The mass of claim 9 wherein said fibrils are autogeneuosly bonded at places of intersection.

11. The mass of claim 8 wherein said fibrils are brazed at places of intersection.

12. The mass of claim 1 wherein said fibrils are bimetallic.

13. The mass of claim 1 wherein said fibrils are coated fibrils.

14. An elongated mat-strip composed of hair-like, substantially uniform length, slightly twisted and bent substantially solid metal fibrils having a substantially squashed rectangular cross-section and having smooth rolled faces and rougher faces, said fibrils being randomly disposed in all directions throughout said mat-strip and intertwined and interlocked together in mat formation, said mat-strip having a density from about 1% to about 2% of the density of the metal of which the fibrils are composed.

15. The mat-strip of claim 14 wherein said fibrils are annealed while in said mat-strip thereby increasing the density of said mat-strip from a range of about 1% to 2% to a range of about 4% to about 6%.

References Cited

UNITED STATES PATENTS

| | | | |
|---|---|---|---|
| 3,127,668 | 4/1964 | Troy | 29—182 |
| 2,616,165 | 11/1952 | Brennan | 29—183 |
| 3,053,713 | 9/1962 | Juras | 29—180 X |
| 2,197,916 | 4/1940 | Balfe | 29—191.4 |
| 2,829,733 | 4/1958 | Bartels et al. | 29—191.4 |
| 2,903,787 | 9/1959 | Brennan | 29—191.2 |
| 3,031,996 | 5/1962 | Botvin | 29—191.4 |
| 3,087,233 | 4/1963 | Turnbull | 29—192 |

L. DEWAYNE RUTLEDGE, Primary Examiner

E. L. WEISE, Assistant Examiner

U.S. Cl. X.R.

29—191